US007757158B2

(12) United States Patent
Mitsuishi

(10) Patent No.: US 7,757,158 B2
(45) Date of Patent: Jul. 13, 2010

(54) CONVERTING HYPERTEXT CHARACTER STRINGS TO LINKS BY ATTACHING ANCHORS EXTRACTED FROM EXISTING LINK DESTINATION

(75) Inventor: Yutaka Mitsuishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 761 days.

(21) Appl. No.: 11/786,721

(22) Filed: Apr. 12, 2007

(65) Prior Publication Data

US 2008/0126400 A1    May 29, 2008

(30) Foreign Application Priority Data

Nov. 24, 2006  (JP)  ............................. 2006-316917

(51) Int. Cl.
*G06F 17/30* (2006.01)
(52) U.S. Cl. ....................................... 715/205; 715/208
(58) Field of Classification Search ................. 715/205, 715/206, 207, 208
See application file for complete search history.

(56) References Cited

U.S. PATENT DOCUMENTS

| 5,355,472 | A | * | 10/1994 | Lewis ................................. | 1/1 |
| 5,603,025 | A | * | 2/1997 | Tabb et al. .......................... | 1/1 |
| 5,724,595 | A | * | 3/1998 | Gentner ........................... | 715/206 |
| 5,745,360 | A | * | 4/1998 | Leone et al. ................... | 715/236 |
| 5,761,683 | A | * | 6/1998 | Logan et al. ................... | 715/206 |
| 5,794,257 | A | * | 8/1998 | Liu et al. ....................... | 715/205 |
| 6,016,494 | A | * | 1/2000 | Isensee et al. ..................... | 1/1 |
| 6,092,074 | A | * | 7/2000 | Rodkin et al. ...................... | 1/1 |
| 6,122,647 | A | * | 9/2000 | Horowitz et al. .............. | 715/205 |
| 6,178,434 | B1 | * | 1/2001 | Saitoh .......................... | 715/234 |
| 6,230,168 | B1 | * | 5/2001 | Unger et al. ................... | 715/206 |
| 6,233,591 | B1 | * | 5/2001 | Sherman et al. .............. | 715/205 |
| 6,295,542 | B1 | * | 9/2001 | Corbin ......................... | 715/205 |
| 6,381,637 | B1 | * | 4/2002 | Kamada ....................... | 709/218 |
| 6,505,197 | B1 | * | 1/2003 | Sundaresan et al. ................. | 1/1 |
| 6,574,644 | B2 | * | 6/2003 | Hsu et al. ..................... | 715/205 |
| 6,581,065 | B1 | * | 6/2003 | Rodkin et al. ...................... | 1/1 |
| 6,658,623 | B1 | * | 12/2003 | Schilit et al. ................. | 715/208 |
| 6,748,385 | B1 | * | 6/2004 | Rodkin et al. ...................... | 1/1 |

(Continued)

FOREIGN PATENT DOCUMENTS

JP          07-325827          12/1995

(Continued)

*Primary Examiner*—Stephen S Hong
*Assistant Examiner*—I-Chan Yang
(74) *Attorney, Agent, or Firm*—Greer, Burns & Crain, Ltd.

(57) ABSTRACT

A link destination hypertext is acquired of an original anchor present in a processing range in an original hypertext, and link destination anchor information composed of a pair of a link destination anchor character string and a link destination URL is extracted from the link destination hypertext. An original anchor effective range is determined which serves as a candidate character string range to which a new anchor is added in the original hypertext, a character string present in the original anchor effective range is compared with a character string present in the link destination anchor information, new anchor information is generated which is composed of a pair of a matched ranged character string and a new link destination URL, and a new anchor is attached to the matched range character string of the original hypertext, so as to convert the original hypertext to a new hypertext.

18 Claims, 30 Drawing Sheets

U.S. PATENT DOCUMENTS

| | | | |
|---|---|---|---|
| 6,751,777 B2 * | 6/2004 | Bates et al. | 715/206 |
| 6,874,019 B2 * | 3/2005 | Hamilton et al. | 709/219 |
| 6,990,494 B2 * | 1/2006 | Bates et al. | 1/1 |
| 7,003,719 B1 * | 2/2006 | Rosenoff et al. | 715/205 |
| 7,013,309 B2 * | 3/2006 | Chakraborty et al. | 1/1 |
| 7,191,400 B1 * | 3/2007 | Buvac et al. | 715/205 |
| 7,233,950 B2 * | 6/2007 | Smith, III | 1/1 |
| 7,418,657 B2 * | 8/2008 | Gorelick et al. | 715/234 |
| 7,594,166 B1 * | 9/2009 | Ramakrishna et al. | 715/234 |
| 2003/0229857 A1 * | 12/2003 | Sayuda et al. | 715/517 |
| 2006/0059416 A1 * | 3/2006 | Lin | 715/501.1 |

FOREIGN PATENT DOCUMENTS

| | | |
|---|---|---|
| JP | 10-049425 | 2/1998 |
| JP | 2000-163432 | 6/2000 |
| JP | 2001-256259 | 9/2001 |

* cited by examiner

```
MENU<br>

<ul>

<li><a href="http://10.20.30.40/abc/aboutus.html">
CORPORATE INFORMATION</a></li>

<li><a href="http://10.20.30.40/abc/products/index.html">
PRODUCT INFORMATION</a></li>

<li><a href="http://10.20.30.40/abc/download/">
DOWNLOAD</a></li>

| CHARACTER STRING OF LINK DESTINATION ANCHOR | LINK DESTINATION URL OF LINK DESTINATION ANCHOR |
|---|---|
| CORPORATE INFORMATION | http://10.20.30.40/abc/aboutus.html |
| PRODUCT INFORMATION | http://10.20.30.40/abc/products/index.html |
| DOWNLOAD | http://10.20.30.40/abc/download/ |

88 → table; 90 = left column; 92 = right column

FIG. 9

| MATCHED RANGE | NEW LINK DESTINATION URL | NEW ANCHOR CHARACTER STRING |
|---|---|---|
| From:306, To:325 | http://10.20.30.40/abc/products/index.html | PRODUCT INFORMATION |

94 → table; 96 = left column; 98 = middle column; 100 = right column

FIG. 12A

| MATCHED RANGE | NEW LINK DESTINATION URL | NEW ANCHOR CHARACTER STRING |
|---|---|---|
| From:306, To:310 | http://10.20.30.40/abc/products/index.html | (THE PAGE OF ABC : PRODUCT INFORMATION) |

| MATCHED RANGE | NEW LINK DESTINATION URL | NEW ANCHOR CHARACTER STRING | PRIORITY |
|---|---|---|---|
| From:306, To:325 | http://10.20.30.40/def/products/index.html | ----- | 2 |
| From:306, To:325 | http://10.20.30.40/abc/products/index.html | ----- | 1 |

FIG. 20A

UPDATE HISTORY

9/25/2006   "PHOTO STUDIO→PHOTO ALBUM OF FLOWERS" IS UPDATED.

9/20/2006   DIARY IS UPDATED.

RETURN TO TOP PAGE

FIG. 20B

```
<h1>UPDATE HISTORY</h1>
<table>
<tr><td>9/25/2006</td><td>"PHOTO STUDIO→PHOTO ALBUM OF FLOWERS" IS UPDATED </td></tr><tr><td>9/20/2006</td><td>DIARY IS UPDATED</td></tr></table>
<br>
<a href="http://10.30.50.70/~xyz/>RETUEN TO TOP PAGE
</a>
```

| CHARACTER STRING OF LINK DESTINATION ANCHOR | LINK DESTINATION URL OF LINK DESTINATION ANCHOR |
|---|---|
| DIARY | http://10.30.50.70/~xyz/diary.html |
| PHOTO STUDIO | http://10.30.50.70/~xyz/photo/ |

| MATCHED RANGE | NEW LINK DESTINATION URL | NEW ANCHOR CHARACTER STRING |
|---|---|---|
| From:574, To:579 | http://10.30.50.70/~xyz/diary.html | DIARY |
| From:515, To:527 | http://10.30.50.70/~xyz/photo/ | PHOTO STUDIO |

| CHARACTER STRING OF LINK DESTINATION ANCHOR | LINK DESTINATION URL OF LINK DESTINATION ANCHOR |
|---|---|
| PHOTO ALBUM OF FLOWERS | http://10.30.50.70/~xyz/photo/flower.html |
| PHOTO ALBUM OF INSECTS | http://10.30.50.70/~xyz/photo/insect.html |

| MATCHED RANGE | NEW LINK DESTINATION URL | NEW ANCHOR CHARACTER STRING |
|---|---|---|
| From:529, To:551 | http://10.30.50.70/~xyz/photo/flower.html | PHOTO ALBUM OF FLOWERS |

```
<h1>UPDATE HISTORY</h1>
<table>
<tr><td>9/25/2006</td><td> "<a href="http://10.30.50.7    174
0/~xyz/photo/">PHOTO STUDIO</a>→<a href="http://   178
10.30.50.70/~xyz/photo/flower.html">PHOTO ALBUM OF
FLOWERS</a>" IS UPDATED</td></tr>
<tr><td>9/20/2006</td><td><a href="http://10.30.50.70/   176
~xyz/diary.html">DIARY</a> IS UPDATED</td></tr>
</table>
<br>
<a href="http://10.30.50.70/~xyz/> RETURN TO TOP
PAGE</a>
```

132

CONVERTING HYPERTEXT CHARACTER STRINGS TO LINKS BY ATTACHING ANCHORS EXTRACTED FROM EXISTING LINK DESTINATION

This application is a priority based on prior application No. JP 2006-316917, filed Nov. 24, 2006, in Japan.

BACKGROUND OF THE INVENTION

1. Field of the Invention

The present invention relates to the hypertext conversion program, method, and device which automatically attach link destination anchors of the link destination hypertext which is acquired from an anchor of a hypertext, to the original hypertext and, in particular, relates to the hypertext conversion program, method, and device which attach appropriate link destination anchors relevant to the contexts of the original hypertext to the original hypertext.

2. Description of the Related Arts

Conventionally, when a hypertext of a web page is created by using HTML, anchors are embedded therein to hyperlink to other web pages in accordance with needs. Generally, many people consider it as a courtesy or formality to provide a link to the top page of another web site when posting a link to the hypertext of another web site. However, the page desired to be browsed through the provided link is not always the top page of the link destination, but often an inner page linked from a menu of the top page. In this case, a link may be provided directly to the inner page and not to the top page of the link destination; however, the link to the top page is provided in many cases since web page creators of link sources accept a link destination web site creator's request of prohibiting them from linking to inner pages or consider it to be against courtesy to provide links to inner pages. Therefore, in conventional linking of hypertexts, when a user opens a hypertext and operates an anchor to know information in further detail, the user finds that the link is provided so that the homepage of the link destination is opened, and must search for and select a menu item which likely corresponds to the required information from menus of the homepage, which leads to a problem where it takes labor and time until the user can reach the required information. In order to solve such a problem, there are many automatic linking methods which enable browsing of the required information by following links from the homepage to which the link is provided when the hypertext is opened. In the method according to JP07-325827, as one of such automatic linking methods, keywords are extracted from the hypertext of the link destination, and links are provided based on the keywords. In the methods according to JP10-049425 and JP 2000-163432, links are provided when character strings in the hypertext of the link destination are matched with the character strings registered in a dictionary. Furthermore, in the method according to JP2001-256259, links are followed up to a predetermined depth, and anchors are newly created in the original page to provide links.

However, such conventional automatic linking methods are sometimes inconvenient since the links which are automatically provided when the hypertext is opened are not always useful to the user. For example, in the methods according to Patent JP07-325827, JP10-049425 and JP2000-163432, links may be provided to reference information which is not directly concerned with the original hypertext or to information in different contexts. In the method according to JP2001-256259, links are provided to the contextually related hypertext groups to which the original hypertext is directly or indirectly linked; however, since all the anchors which are obtained by following all the links are unconditionally added to the original hypertext, it is difficult to judge which anchors are useful for the user.

SUMMARY OF THE INVENTION

According to the present invention there is provided the hypertext conversion program, method, and device which provide links only if anchor information of the hypertext groups of the link destination to which the hypertext is directly or indirectly linked is appropriate in terms of the contexts related to the anchors of the link source.

(Program)

The present invention provides a hypertext conversion program executed by a computer.

The present invention causes a computer to execute a processing starting part determination step in which a processing starting part is determined in an original hypertext serving as a processing object;

a processing range determination step in which a processing range including an original anchor in the original hypertext is determined based on the processing starting part;

a link destination hypertext acquisition step in which a link destination hypertext of the original anchor present in the processing range is acquired;

a link destination anchor information extraction step in which pieces of link destination anchor information composed of a pair of a character string and a link destination URL of a link destination anchor are extracted from the link destination hypertext;

an original anchor effective range determination step in which an original anchor effective range is determined which serves as a candidate character string range to which a new anchor is added in the original hypertext;

a character string comparison step in which a character string present in the original anchor effective range is compared with the character string present in the link destination anchor information, and in which a matched range in the original anchor effective range is determined; and a new anchor information generation step in which the link destination URL paired with the link destination character string of the link destination anchor information which is matched in the character string comparison is set as a new link destination URL, and in which new anchor information is generated composed of a pair of the matched range and the new link destination URL.

The hypertext conversion program according to the present invention is characterized by further causing the computer to execute a new anchor attachment step in which a new anchor describing the new link destination URL in the new anchor information is attached to a character string of the original hypertext present in the matched range in the new anchor information, so as to convert the original hypertext to a new hypertext.

In the new anchor attachment step, the character string of the matched range is set as a new anchor character string of the new anchor.

In the new anchor attachment step, a combination character string in which the original anchor character string is combined with the character string of the matched range may be generated as a new anchor character string of the new anchor.

For example, in the new anchor attachment step, (1) a character string in which the original anchor character string is combined with the matched range character string via a predetermined connection symbol, or (2) a character string in which the original anchor character string is combined with the matched range character string via a predetermined connection symbol, and is further surrounded by predetermined separation symbols is generated as a new anchor character string.

The hypertext conversion program according to the present invention further includes a recursive processing step in which the new anchor information generated in the new anchor information generation step is considered as an original anchor in the original hypertext, and the processes of the processing starting part determination step, the processing range determination step, the link destination hypertext acquisition step, the link destination anchor information extraction step, the anchor effective range determination step, the character string comparison step and the new anchor information generation step, or the processes to which a new anchor attachment step is further added thereto are respectively recursively executed.

In the processing starting part determination step, a character string matched with a predetermined character string pattern indicating a link which is present in the vicinity of the original anchor character string present in the original hypertext is searched for and determined as the processing starting part.

In the processing range determination step, a sentence which includes the original anchor character string present in the original hypertext and the processing starting part and which is separated by a punctuation mark, a block which includes the original anchor character string and the processing starting part and which is separated by a predetermined block separation symbol, or the entire original hypertext is determined as the processing range.

In the original anchor effective range determination step, a sentence which includes the original anchor character string and which is separated by a punctuation mark, a block which includes the original anchor character string and which is separated by a predetermined block separation symbol, or the entire original hypertext is determined as an original anchor effective range.

In the new anchor information generation step, when a plurality of new link destination URLs correspond to the same matched range in the new anchor information, priorities are given to the plurality of new link destination URLs.

In the new anchor attachment step, when a plurality of new link destination URLs correspond to the same matched range of the new anchor information, a plurality of new anchors corresponding to the plurality of new link destination URLs are attached to the matched range in the original hypertext.

In the new anchor information generation step, when a plurality of new link destination URLs correspond to the same matched range of the new anchor information, priorities are given to the new link destination URLs; and, in the new anchor attachment step, a plurality of new anchors corresponding to the plurality of new link destination URLs are attached to the matched range in the original hypertext based on the priorities.

In the new anchor attachment step, for attachment of the new anchors according to the priorities, (1) a process of attaching the new anchor having the highest priority, (2) a process of attaching the plurality of new anchors in the order of the priorities, (3) a process of attaching the new anchor having the priority higher than a predetermined threshold value, or (4) a process of attaching a predetermined number of the new anchors in the order of the priorities is executed.

In the processing starting part determination step, when a title of the original hypertext is matched with a predefined title condition, an anchor matched with the predefined anchor condition is set as the original anchor so as to determine the processing starting part; and, in the processing range determination step, the processing range is determined as the entire original hypertext.

Specifically, in the processing starting part determination step, update information or new information is defined as the title; TOP, top page, homepage, or a synonym thereof is defined as the anchor condition; and an anchor matched with the TOP, the top page, the homepage, or the synonym thereof is set as an original anchor.

The computer which executes the hypertext conversion program is a client which accesses a web page on a network so as to receive and display the original hypertext, a proxy cache server which is disposed in the client side, or a server which transmits the original hypertext with respect to a browsing request from a client; and the client or the proxy cache server executes the hypertext conversion program when receiving the original hypertext, and the server executes the hypertext conversion program when transmitting the original hypertext.

(Method)

The present invention provides a hypertext conversion method executed by a client which browses a web page, a proxy cache server which substitutes the process of the client, or a web server which transmits a hypertext with respect to a browsing request of the client.

The hypertext conversion method according to the present invention is characterized by including a processing starting part determination step in which a processing starting part is determined in an original hypertext serving as a processing object;

a processing range determination step in which a processing range including an original anchor in the original hypertext is determined based on the processing starting part;

a link destination hypertext acquisition step in which a link destination hypertext of the original anchor present in the processing range is acquired;

a link destination anchor information extraction step in which link destination anchor information composed of a pair of a character string and a link destination URL of a link destination anchor is extracted from the link destination hypertext;

an original anchor effective range determination step in which an original anchor effective range is determined which serves as a candidate character string range to which a new anchor is added in the original hypertext;

a character string comparison step in which a character string present in the original anchor effective range is compared with the character string present in the link destination anchor information, and in which a matched range in the original anchor effective range is determined; and a new anchor information generation step in which the link destination URL paired with the link destination character string of the link destination anchor information which is matched in the character string comparison is set as a new link destination URL, and in which new anchor information is generated composed of a pair of the matched range and the new link destination URL; and, in accordance with needs, further by including a new anchor attachment step in which a new anchor describing the new link destination URL in the new anchor information is attached to a character string of the original hypertext present in the matched range in the new anchor information, so as to convert the original hypertext to a new hypertext.

(Device)

The present invention provides a hypertext conversion device which functions as a client which browses a web page, as a proxy cache server which substitutes the process of the client, or as a server which transmits a web page with respect to a browsing request of the client.

The hypertext conversion device according to the present invention is characterized by having a processing starting part determination unit which determines a processing starting part in an original hypertext serving as a processing object;

a processing range determination unit which determines an processing range including an original anchor in the original hypertext based on the processing starting part;

a link destination hypertext acquisition unit which acquires a link destination hypertext of the original anchor present in the processing range;

a link destination anchor information extraction unit which extracts link destination anchor information composed of a pair of a character string and a link destination URL of a link destination anchor from the link destination hypertext;

an original anchor effective range determination unit which determines an original anchor effective range which serves as a candidate character string range to which a new anchor is added in the original hypertext;

a character string comparison unit which compares a character string present in the original anchor effective range with the character string present in the link destination anchor information and determines a matched range in the original anchor effective range; and a new anchor information generation unit which sets the link destination URL paired with the link destination character string of the link destination anchor information which is matched in the character string comparison as a new link destination URL and generates new anchor information composed of a pair of the matched range and the new link destination URL; and, in accordance with needs, further by having a new anchor attachment unit which attaches a new anchor describing the new link destination URL in the new anchor information to a character string of the original hypertext present in the matched range in the new anchor information, so as to convert the original hypertext to a new hypertext.

According to the present invention, when link destination anchor information followed from a link through an original anchor of an original hypertext is matched with or included partially in link source anchor information, it is determined to be an appropriate link destination so as to attach a new anchor to the original hypertext and provide a link; therefore, an appropriate link can be provided for browsing useful information for a user which is relevant in terms of context and to where a content creator of the original hypertext conceivably intends to lead the user. Moreover, the process of attaching the new anchor, which provides a link to a link destination determined to be appropriate according to the present invention, to the original hypertext so as to convert it to a new hypertext is automatically performed as a process of the client side or the server side every time when a hypertext of the web server is browsed by the client; and the concept is not altered of providing a link to a top page, etc. in the original hypertext created by a content producer. Furthermore, when the content producer applies the present invention to an original hypertext, an appropriate link can be automatically provided for browsing useful information which is relevant in terms of context and to which the content creator of the original hypertext conceivably intends to lead the user, and the invention can be therefore utilized as an editor of hypertexts as well. The above and other objects, features, and advantages of the present invention will become more apparent from the following detailed description with reference to the drawings.

BRIEF DESCRIPTION OF THE DRAWINGS

FIG. 8 is an explanatory diagram of a link destination anchor information table generated from a link destination hypertext in the present embodiment;

FIG. 9 is an explanatory diagram of a new anchor information table generated in the present embodiment;

FIGS. 12A to 12C are also explanatory diagrams of the present embodiment wherein a new anchor character string in which the original anchor character string is combined with the matched range character string is generated and a new anchor is attached;

FIG. 16 is an explanatory diagram of a new anchor information table generated from the link destination hypertexts of the two original anchors of FIG. 15;

FIGS. 20A and 20B are explanatory diagrams showing a special original hypertext which denotes another embodiment of the present invention;

FIG. 22 is an explanatory diagram of a link destination anchor information table generated from the link destination hypertext of FIGS. 20A and 20B;

FIG. 23 is an explanatory diagram of a new anchor information table generated from the link destination anchor information table of FIG. 22;

FIG. 25 is an explanatory diagram of a link destination anchor information table generated from the link destination hypertext of FIGS. 24A and 24B;

FIG. 26 is an explanatory diagram of a new anchor information table generated from the link destination anchor information table of FIG. 25;

FIGS. 27A and 27B are explanatory diagrams of a new hypertext to which new anchors are attached from the new anchor information of FIG. 23 and FIG. 26;

DETAILED DESCRIPTION OF THE PREFERRED EMBODIMENTS

Figure 1:
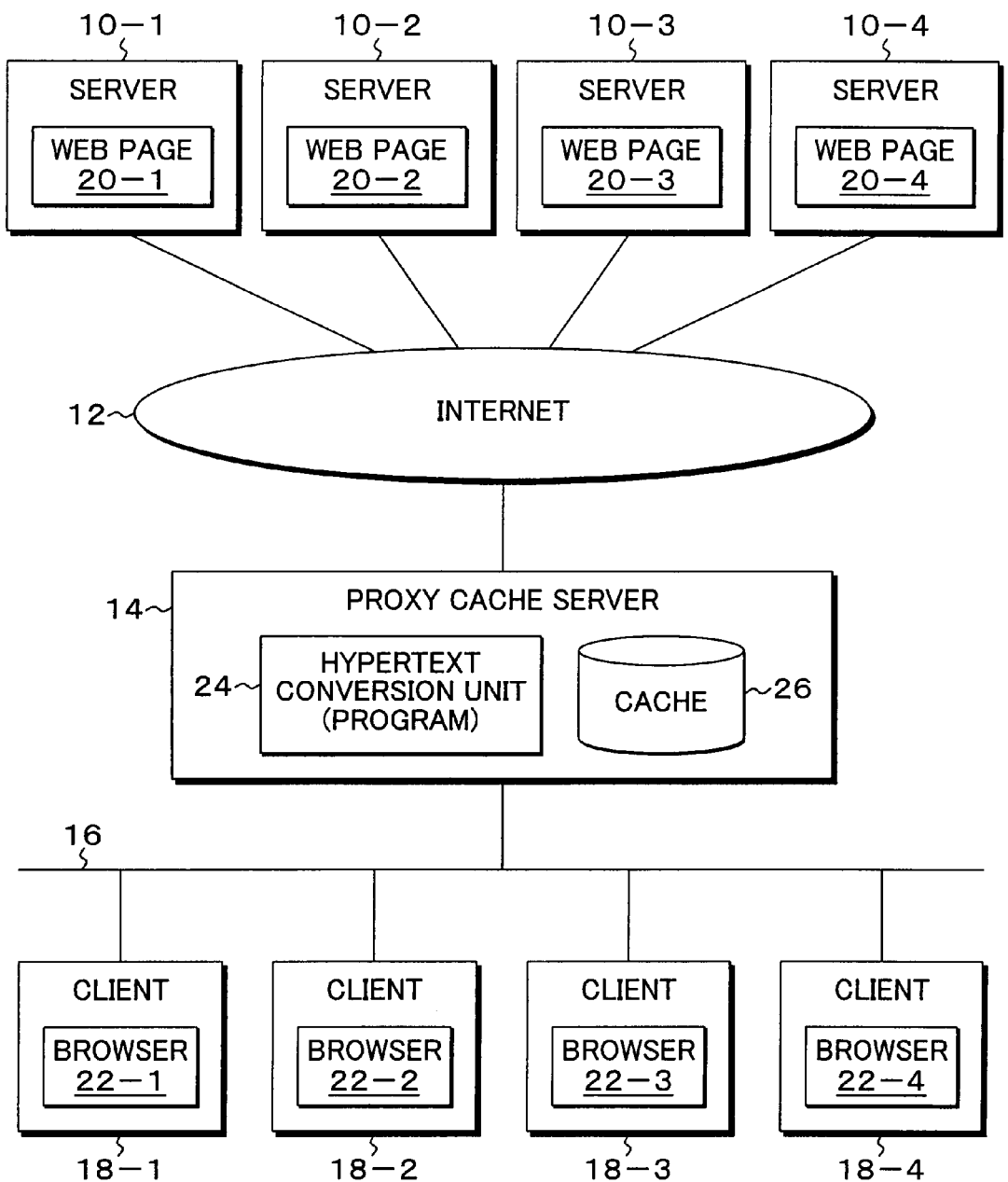
FIG. 1 is a block diagram of a system configuration to which a hypertext conversion process of the present invention is applied.

FIG. 1 is a block diagram of a system configuration to which a hypertext conversion process according to the present invention is applied. In FIG. 1, servers 10-1 to 10-4 are connected to Internet 12 and have web pages 20-1 to 20-4 which are hypertexts described in HTML, respectively. In the present embodiment, an intracompany LAN 16 is connected to the Internet 12 via a proxy cache server 14, and clients 18-1 to 18-4 are connected to the LAN 16. In each of the clients 18-1 to 18-4, browsers 22-1 to 22-4 are provided which are used for browsing the web pages 20-1 to 20-4 in the servers 10-1 to 10-4. In FIG. 1, the hypertext conversion process according to the present invention is executed by the proxy cache server 14. Therefore, a hypertext conversion unit 24 according to the present invention is provided in the proxy cache server 14. The hypertext conversion unit 24 is a function realized by executing a program. Moreover, a cache 26 is provided in the proxy cache server 14 so that web pages accessed by the clients 18-1 to 18-4 can be stored in the cache 26 with effective periods specified and that the clients 18-1 to 18-4 can acquire the web pages from the cache 26 during the effective periods. When acquiring the hypertexts of the web pages in any of the servers 10-1 to 10-4 through access from the side of the clients 18-1 to 18-4, the hypertext conversion unit 24 according to the present invention provided in the proxy cache server 14 generates and attaches new anchors for automatically linking to a link destination hypertext based on link destination anchors provided in the hypertext, thereby converting them into a new hypertext and providing them to the client side.

Figure 2:
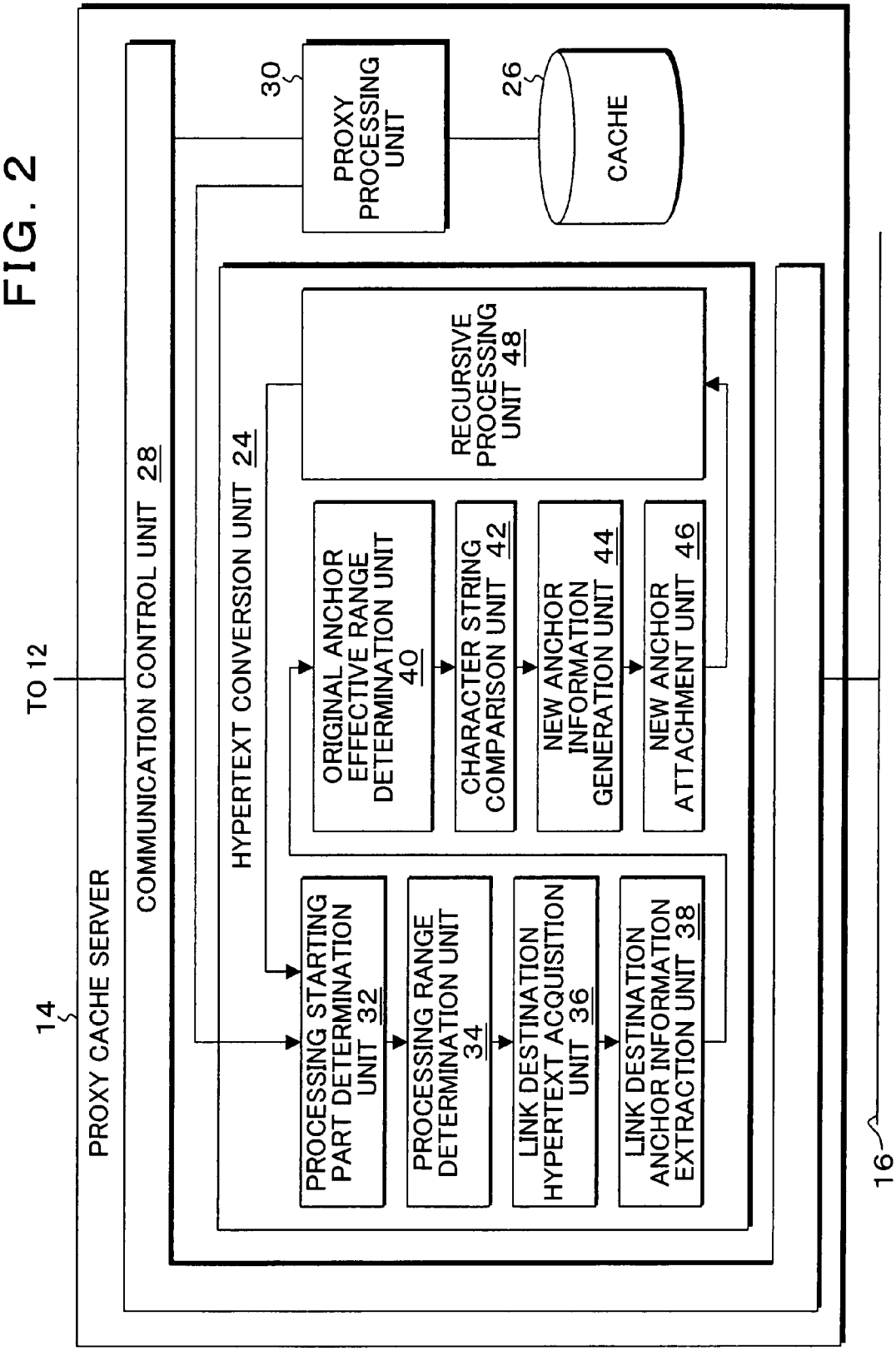
FIG. 2 is a block diagram showing an embodiment of a proxy cache server having a hypertext conversion function of the present invention.

FIG. 2 is a block diagram showing an embodiment of the proxy cache server 14 having a hypertext conversion function according to the present invention. In FIG. 2, the proxy cache server 14 can connect to the Internet 12 and the LAN 16 and carry out communication processing by means of the communication control unit 28, the cache 26 is disposed for the communication control unit 28 via a proxy processing unit 30, and the hypertext conversion unit 24 is disposed which is an embodiment of the present invention. Provided in the hypertext conversion unit 24, as functions realized by executing a hypertext conversion program, are a processsing starting part determination unit 32, a processing range determination unit 34, a link destination hypertext acquisition unit 36, a link destination anchor information extraction unit 38, an original anchor effective range determination unit 40, a character string comparison unit 42, a new anchor information generation unit 44, a new anchor attachment unit 46, and a recursive processing unit 48. The processing starting part determination unit 32 determines a processing starting position in an original hypertext which serves as a processing object. The processing range determination unit 34 determines an processing range including an original anchor in the original hypertext based on the processing starting part determined by the processing starting part determination unit 32. The link destination hypertext acquisition unit 36 acquires a link destination hypertext of the original anchor which is present in the processing range. The link destination anchor information extraction unit 38 extracts link destination anchor information, which is composed of a pair of a character string of a link destination anchor and a link destination URL, from the link destination hypertext. The original anchor effective range determination unit 40 determines an original anchor effective range which serves as the range of a candidate character string to which a new anchor is added in the original hypertext. The character string comparison unit 42 compares the character string present in the original anchor effective range with the character string present in the link destination anchor information extracted by the link destination anchor information extraction unit 38 and determines a matched range in the original anchor effective range. The new anchor information generation unit 44 sets the link destination URL, paired with the anchor character string of the link destination anchor information which is matched in the comparison of the character string comparison unit 42, as a new link destination URL and generates new anchor information composed of a pair of the matched range and the new link destination URL. The new anchor attachment unit 46 attaches a new anchor, which describes the new link destination URL in the new anchor information, to the character string (matched range character string) of the original hypertext which is present in the matched range in the new anchor information generated by the new anchor information generation unit 44, so as to convert the original hypertext into a new hypertext. The recursive processing unit 48 considers the new anchor information generated by the new anchor information generation unit 44 as an original anchor in the original hypertext, recursively executes the series of processes of the processing starting part determination unit 32 to the new anchor attachment unit 46, and, in accordance with the number of the recursive processing, converts it into new hypertext in which new anchors are attached to the original hypertext. The recursive processing executed by the recursive processing unit 48 is repeated until no more new anchor is generated or up to a predetermined depth (number of times).

Figure 3:
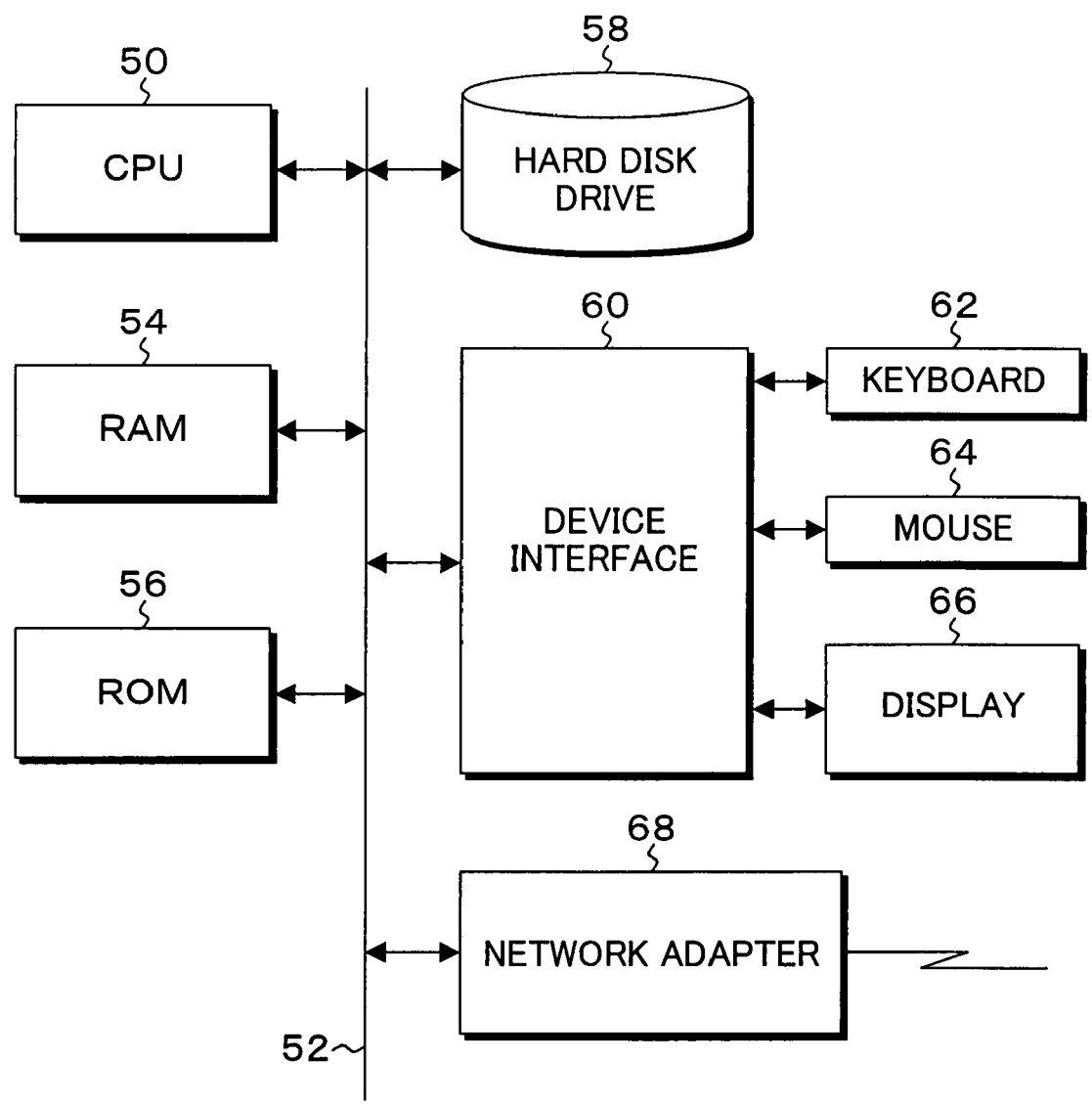
FIG. 3 is a block diagram of a hardware environment of a computer in which a hypertext conversion program of the present invention is executed.

FIG. 3 is a block diagram showing a hardware environment of a computer in which the hypertext conversion program according to the present invention is executed, and which corresponds in FIG. 1 to a computer which constitutes the proxy cache server 14. In FIG. 3, the hardware environment of the computer is provided with a CPU 50 and, with respect to a bus 52 of the CPU 50, is provided with a RAM 54, a ROM 56, a hard disk drive 58, a device interface 60 connecting a keyboard 62, a mouse 64 and a display 66, and a network adapter 68. The hypertext conversion program according to the present embodiment is stored in the hard disk drive 58. When the computer is started up, after an OS is read and allocated from the hard disk drive 58 to the RAM 54 through a boot-up process caused by operations of BIOS, the hypertext conversion program according to the present embodiment is read and allocated from the hard disk drive 58 to the RAM 54 upon execution of the OS and is executed by the CPU 50.

Figure 4A:
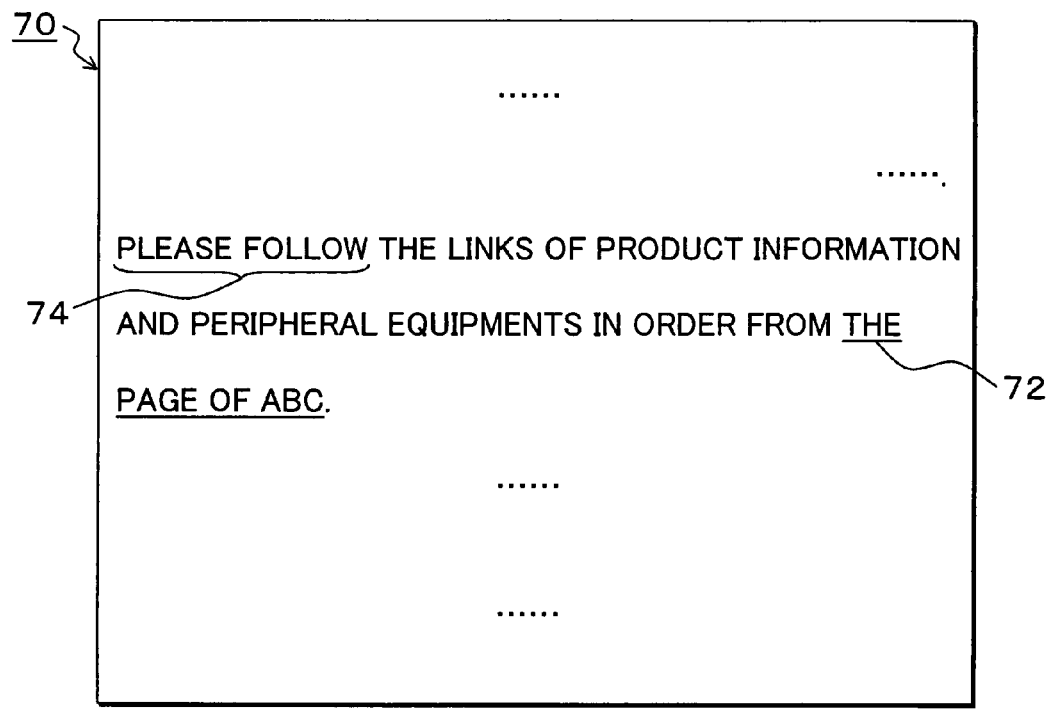
FIGS. 4A and 4B are explanatory diagrams of a hypertext to be processed in the present embodiment.
Figure 4B:
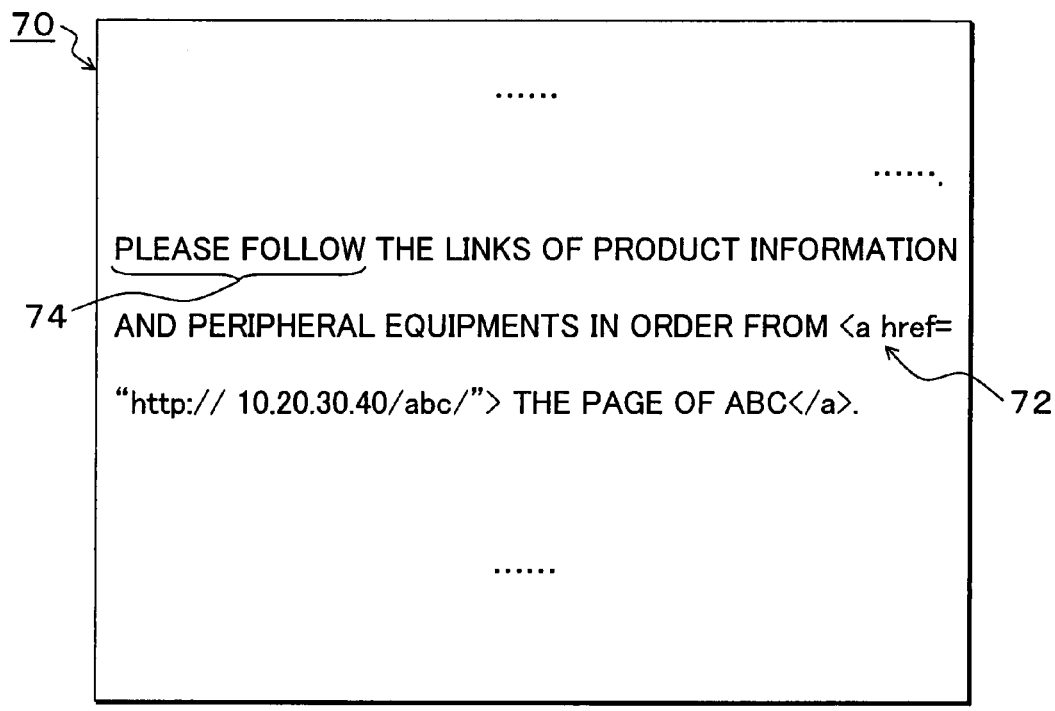

Next, the functions of the hypertext conversion unit 24 shown in FIG. 2 will be described in detail. FIGS. 4A and 4B are explanatory diagrams of a hypertext serving as a processing object in the present embodiment. FIG. 4A shows the hypertext serving as a processing object and shown in a screen by the browser, which is referred to as an original hypertext 70 in the present embodiment. Present in the original hypertext 70 is an original anchor 72 in which "THE PAGE OF ABC" is specified as an anchor character string.

Figure 5:
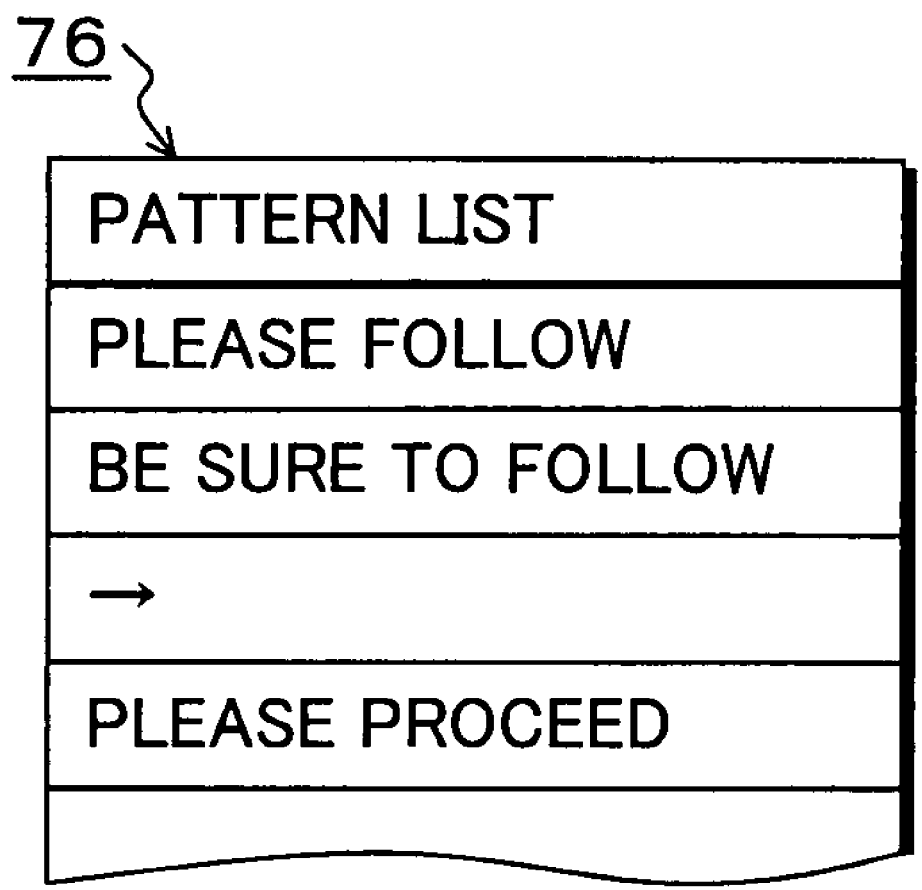
FIG. 5 is an explanatory diagram of a pattern definition table used in determination of a processing starting part in the present embodiment.

FIG. 4B shows the original anchor 72 in the original hypertext 70 of FIG. 4A in the form of a source sentence. In this form of a source sentence, the original anchor 72 describes "http://10.20.30.40/abc/" as a link destination URL. In the hypertext conversion unit 24 according to the present embodiment of FIG. 2, a processing starting part is first determined for the original hypertext 70 of FIGS. 4A and 4B by the processing starting part determination unit 32. The determination of the processing starting part is made using a pattern definition table 76 shown in FIG. 5. In the pattern definition table 76 of FIG. 5, character strings such as "PLEASE FOLLOW", "BE SURE TO FOLLOW", "R", and "PLEASE PROCEED" which indicate the presence of hyperlinks are preregistered as definition patterns. The processing starting part determination unit 32 of FIG. 2 performs matching with the original hypertext 70 of FIGS. 4A and 4B by using the pattern group registered in the pattern definition table 76, and determines a processing starting part 74 corresponding to, for example, the pattern "PLEASE FOLLOW". The process executed by the processing starting part determination unit 32 may be replaced by methods such as partial matching using arbitrary rules and matching according to regular expressions.

Figure 6A:
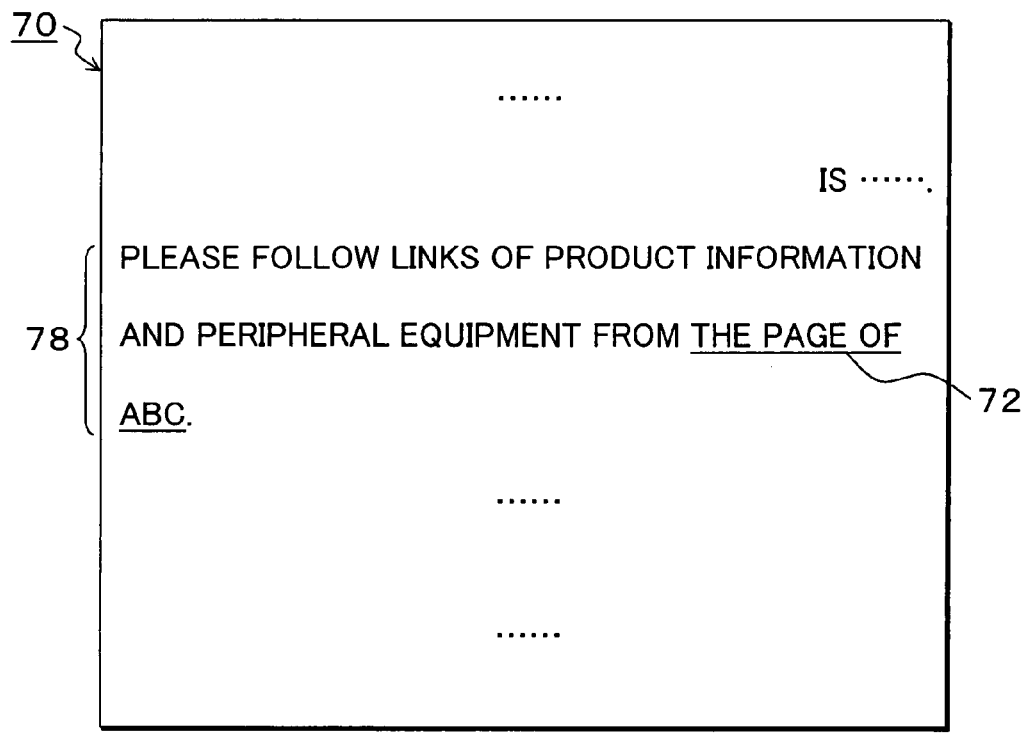
FIGS. 6A and 6B are explanatory diagrams of a processing range determined in the present embodiment.
Figure 6B:
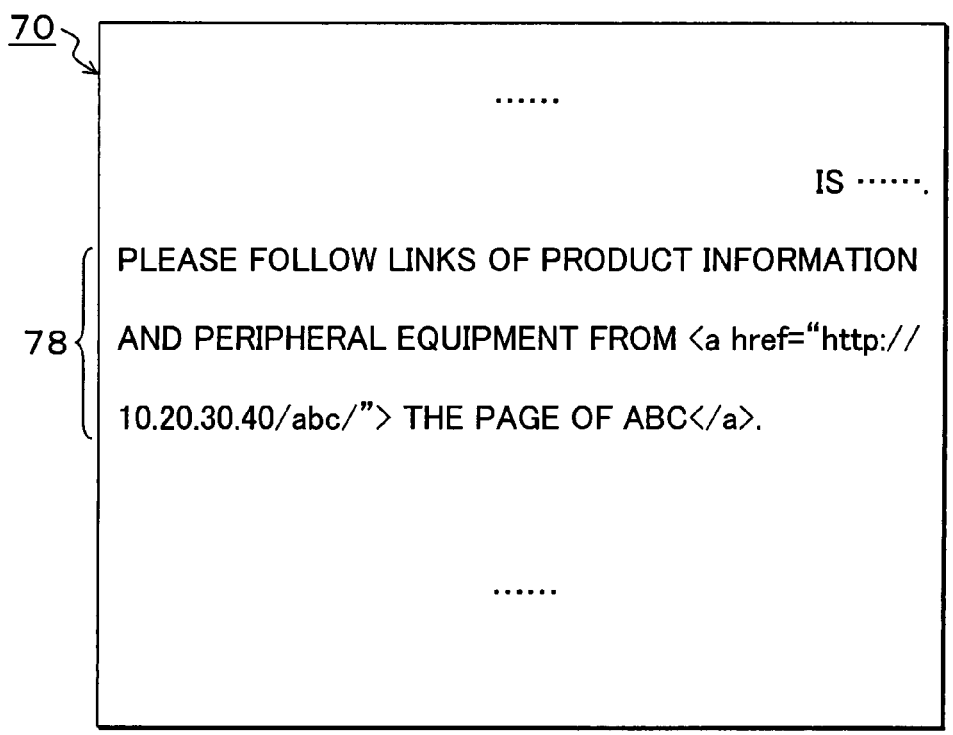

In FIGS. 4A and 4B, when "PLEASE FOLLOW" is determined in the processing starting part 74, "From: 320, To: 333" is acquired as range information indicating the processing starting part 74. Note that "From: 320, To: 333" means "the range of the 320th character to the 333rd character from the top of the original hypertext 70". Herein, the range information is expressed by using "From" and "To" like "From: 320, To: 333"; however, it may be expressed in a different format as long as the range in the original hypertext can be specified by the method. The range information of a processing range or an original anchor effective range, which will be described later, may be similarly expressed in a different format. Subsequently, the processing range determination unit 34 of FIG. 2 determines the vicinity of the processing starting part 74 of FIGS. 4A and 4B as a processing range. In the present embodiment, as shown in FIGS. 6A and 6B, one sentence including the processing starting part is determined as the processing range 78, wherein a punctuation mark is considered as a separation symbol of one sentence. "From: 320, To: 424s" is acquired as the range information of the processing range 78 in FIGS. 6A and 6B. In the present embodiment, the sentence including the processing starting part 74 is determined as the processing range 78; however, one block including an original anchor 72 may be determined as the processing range by using <h1>, </h1>, <h2>, </h2>, <h3>, </h3>, <p>, <td>, </td>, <li>, </l1>, which are used in source sentences, as separation symbols, or the entire original hypertext may be determined as the processing range. Furthermore, the processing range may be varied in accordance with the pattern contents in the pattern definition table 76 of FIG. 5 used by the processing range determination unit 34. Next, the link destination hypertext acquisition unit 36 of FIG. 2 extracts the original anchor 72 from the processing range 78 of FIGS. 6A and 6B, which is determined by the processing range determination unit 34, and acquires a link destination hypertext. In FIGS. 6A and 6B, the hypertext is acquired of the link destination indicated by the URL "http://10.20.30.40/abc/" in the original anchor 72.

Figures 7A, 7B:
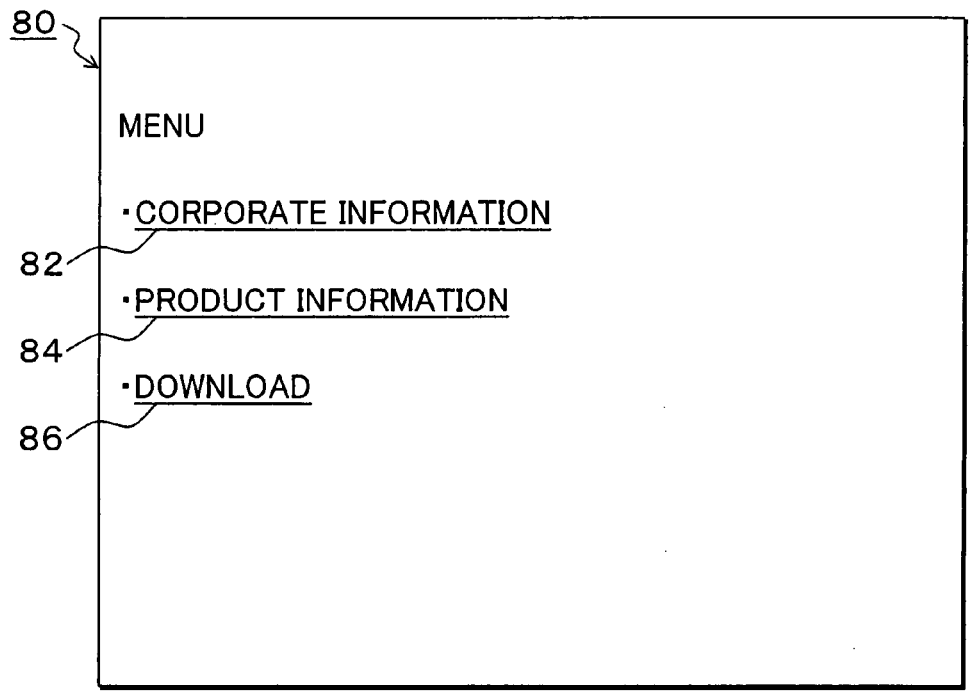
FIGS. 7A and 7B are explanatory diagrams of a link destination hypertext acquired by operation of original anchors in the present embodiment.
Figure 10A:
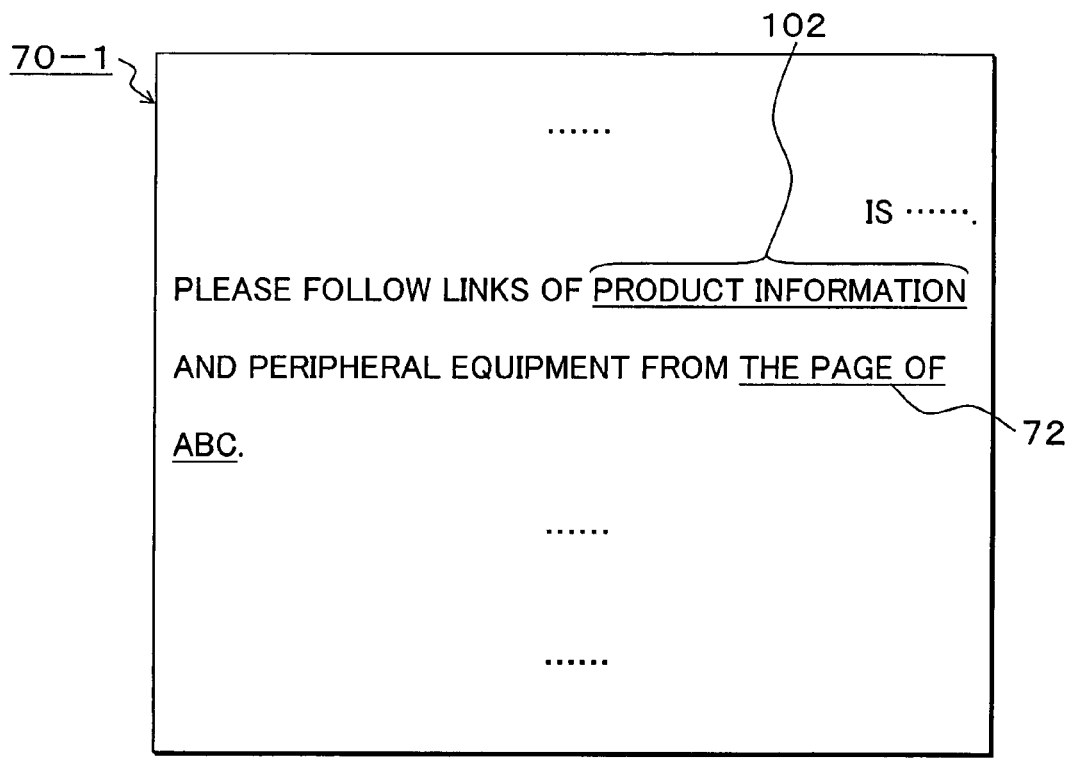
FIGS. 10A and 10B are explanatory diagrams of a converted new hypertext wherein a new anchor is attached in the present embodiment.
Figure 10B:
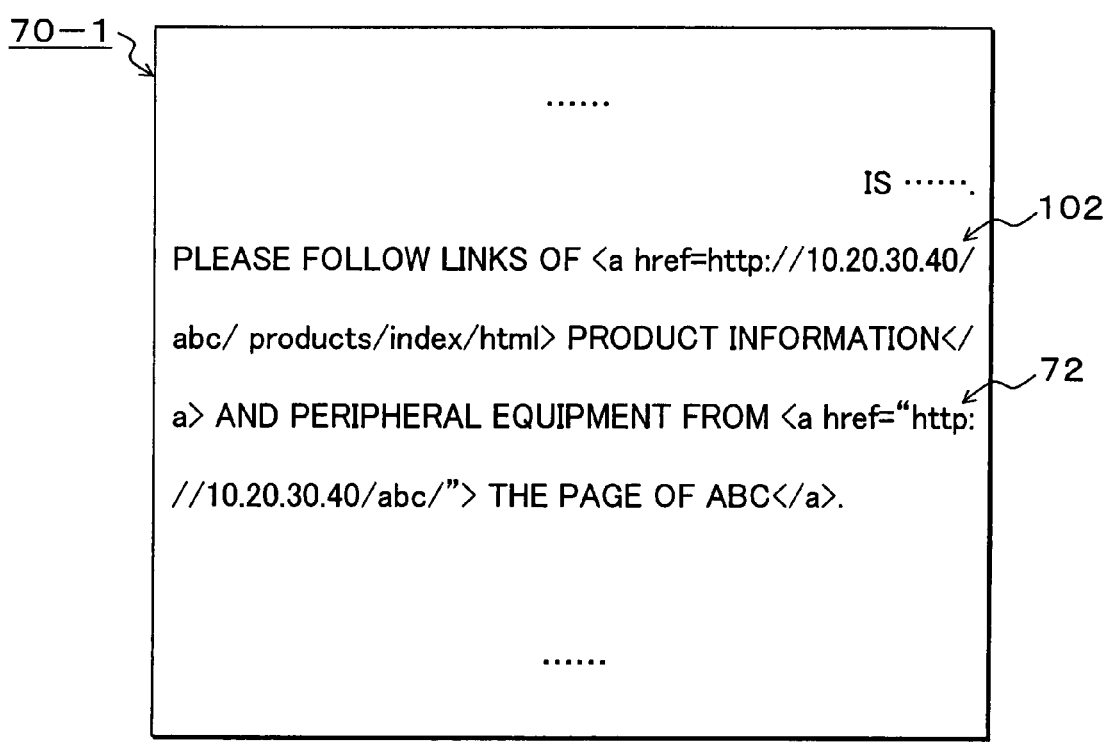

FIGS. 7A and 7B show a link destination hypertext 80 acquired by extracting the original anchor 72 of FIGS. 6A and 6B. Three link destination anchors 82, 84, and 86 are present in the link destination hypertext 80 of FIG. 7A. FIG. 7B shows the link destination anchors 82, 84 and 86 in the form of source sentences. Next, the link destination anchor information extraction unit 38 of FIG. 2 analyzes the source sentences of the link destination anchors 82, 84 and 86 in the link destination hypertext 80 of FIG. 7B, and generates a link destination anchor information table 88 shown in FIG. 8. The link destination anchor information table 88 comprises link anchor information composed of pairs of character strings 90 and link destination URLs 92 of the link destination anchors. In the case of the link destination anchors 82, 84 and 86 of FIG. 7B, "CORPORATE INFORMATION", "PRODUCT INFORMATION", and "DOWNLOAD" are respectively extracted as the character strings 90 of the link destination anchors, and, corresponding to the character strings, the URLs are extracted which are described in the source sentences as the link destination URLs 92 of the link destination anchors. Next, the original anchor effective range determination unit 40 of FIG. 2 uses the link destination anchor information registered in the link destination anchor information table 88 of FIG. 8, so as to determine an original anchor effective range which serves as the candidate character string range to which new anchors are added in the original hypertext 70 of FIGS. 4A and 4B. In the present embodiment, one sentence including an original anchor is determined as the original anchor effective range, wherein a punctuation mark serves as a separation symbol of one sentence. Since this range is the same as the processing range 78 shown in FIGS. 6A and 6B, "From: 320, To: 424" is acquired as the range information indicating the original anchor effective range. Herein, in the present embodiment, the sentence including the original range is determined as the original anchor effective range; however, one block including an original anchor may be determined as the original anchor effective range by using <h1>, </h1>, <h2>, </h2>, <h3>, </h3>, <p>, <td>, </td>, <li>, </l1>, which are used in source sentences, as separation symbols, or the entire original hypertext may be determined as the original anchor effective range. Next, the character string comparison unit 42 of FIG. 2 compares the original anchor effective range, which is determined as the range same as the processing range 78 of FIGS. 6A and 6B, with each of the character strings 90 of the link destination anchors in the link destination anchor information which is registered in the link destination anchor information table 88 of FIG. 8. In the present embodiment, the comparison is carried out by using complete matching of the character strings. Through the comparison process, the second character string "PRODUCT INFORMATION" in the link destination anchor information table 88 of FIG. 8 is matched with the original anchor effective range of the original hypertext, and range information "From: 306, To: 325" of the character string "PRODUCT INFORMATION" in the original hypertext 70 of FIGS. 4A and 4B is acquired as a matched range. In the present embodiment, complete matching of the character strings is used as a criterion of the comparison by the character string comparison unit 42; however; it may be replaced by a different comparison method using arbitrary comparison criteria such as prefix, suffix and partial matching. Next, the new anchor information generation unit 44 of FIG. 2 generates a new anchor information table 94 shown in FIG. 9. The new anchor information table 94 comprises new anchor information composed of a matched range 96, a new link destination URL 98 and a new anchor character string 100. Note that, in the present embodiment, the new anchor character string 100 is further disposed in order to simplify explanations, which is a character string generated by the new anchor attachment unit 46 described later. As the matched range 96 of the new anchor information table 94, "From: 306, To: 325" is stored which indicates the range of the character string "PRODUCT INFORMATION" in the original hypertext compared by the character string comparison unit 42. As the new link destination URL 98, the link destination anchor link destination URL 92 is stored which corresponds to "PRODUCT INFORMATION" in the character string 90 of the link destination anchor in the link destination anchor information table 88 of FIG. 8. Next, based on the new anchor information registered in the new anchor information table 94 shown in FIG. 9, the new anchor attachment unit 46 of FIG. 2 converts the original hypertext 70 of FIGS. 4A and 4B and generates a new hypertext 70-1 shown in FIGS. 10A and 10B. FIG. 10A shows the generated new hypertext 70-1, and FIG. 10B shows the anchor part thereof in source sentences.

In the new hypertext 70-1 of FIG. 10A, based on the new anchor information registered in the new anchor information table 94 in FIG. 9, a new anchor 102 is attached to "PRODUCT INFORMATION". Specifically, as shown in the new anchor 102 of FIG. 10B, the character string "PRODUCT INFORMATION" of "From: 306, To: 325" serving as the matched range 96 in the new anchor information table 94 of FIG. 9 is generated as the new anchor character string 100 as shown in the new anchor information table 94 of FIG. 9, and a source code including the new anchor character string "PRODUCT INFORMATION" and the new link destination URL 98 is attached as the new anchor 102. Next, the recursive processing unit 48 of FIG. 2 considers the new anchor 102 in the new hypertext 70-1, which is generated as shown in FIGS. 10A and 10B, as an original anchor (in the same manner as considering the new anchor information of FIG. 9 as an original anchor), and returns to the processing starting part determination unit 32 to repeat a similar hypertext conversion process for the new original anchor "PRODUCT INFORMATION". Through the process repeated by the recursive processing unit 48, while sequentially following links, the anchor information of the link destination related to the context of the original hypertext processing range including an original anchor is attached repeatedly until there is no more links, until the number of processing times has reached a predetermined number of times, or until other predetermined conditions are satisfied such as whether the link is a link to another site. In the present embodiment, a new hypertext is generated upon each repetition in the new anchor attachment unit 46; however, the system may be configured so that the new anchor information table 146 is updated upon each repetition and that a final new hypertext is generated after completion of the repetition in the recursive processing unit 48. The new anchor attachment unit 46 of FIG. 2 generates a new anchor character string in accordance with a predefined rule. Examples of generation rules include the following.

(1) A character string in the matched range in the original hypertext shall be generated as a new anchor character string.

(2) A combination character string in which an original anchor character string in the original hypertext is combined with a character string of the matched range shall be generated as a new anchor character string. The generation rule (1) is the case shown in FIGS. 9 and 10, wherein the character string "PRODUCT INFORMATION" in the matched range in the original hypertext 70 is generated as a new anchor character string without change. The generation rule (2) is further separated into the following generation rules.

(2-1) A character string in which an original anchor character string is combined with a matched range character string via a predetermined connection symbol shall be generated as a new anchor character string.

(2-2) A character string in which an original anchor character string is combined with a matched ranged character string via a predetermined connection symbol shall be further surrounded by predetermined separation symbols to generate a new anchor character string. The character string generated according to the generation rule is used in the following method: replacing the character string of the matched range in the original hypertext by the character string generated according to the generation rule, and preposing or postposing it with respect to the character string of the matched range in the original hypertext.

Figure 11A:
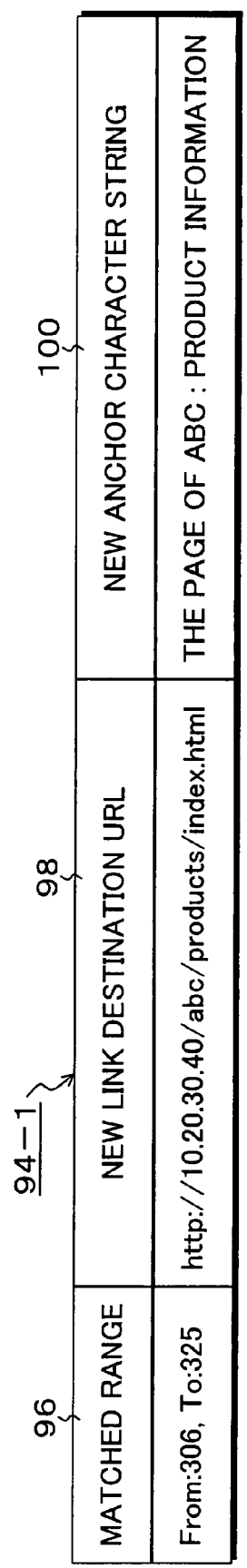
FIGS. 11A to 11C are explanatory diagrams of the present embodiment wherein a new anchor character string in which an original anchor character string and a matched range character string are combined is generated and a new anchor is attached.
Figure 11B:
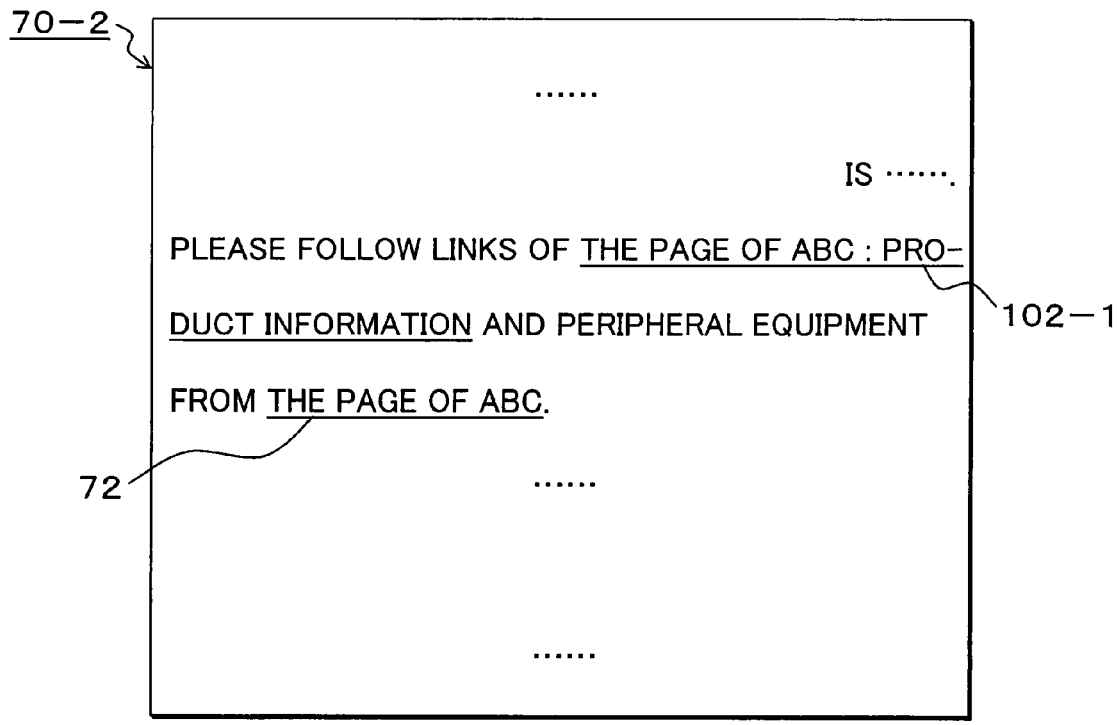
Figure 11C:
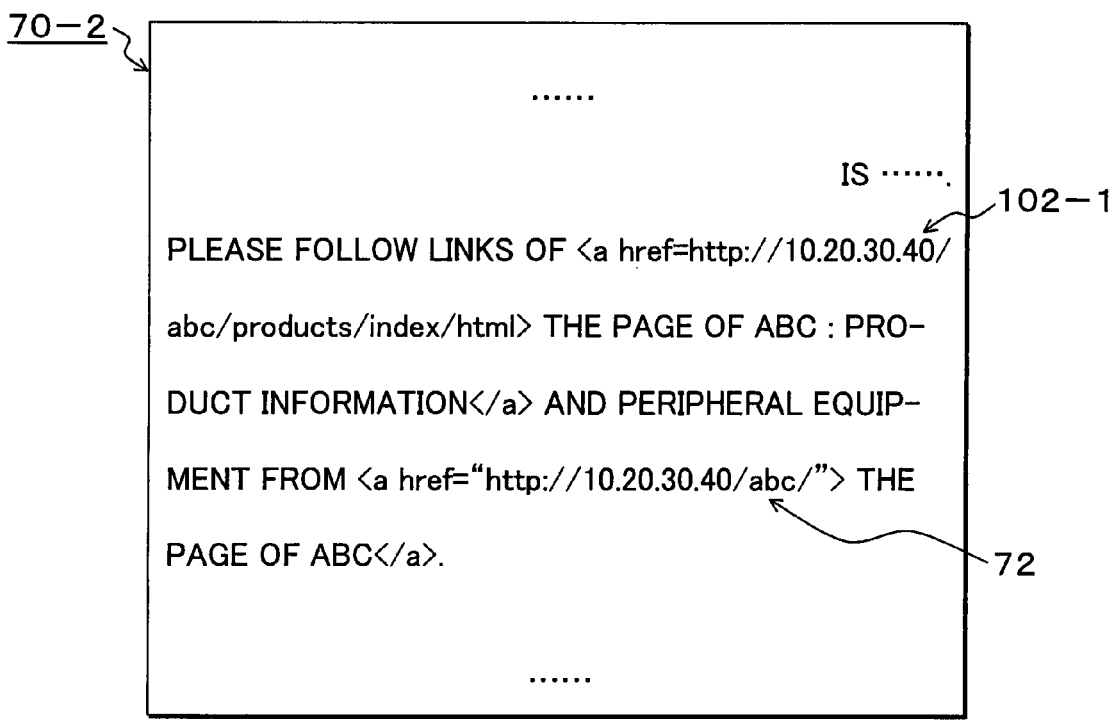

FIGS. 11A to 11C are explanatory diagrams showing generation of a new anchor character string based on the generation rule (2-1). FIG. 11A shows a new anchor information table 94-1 generated by the new anchor attachment unit 46 of FIG. 2. Herein, the matched range 96 and the new link destination URL 98 are the same as those of FIG. 9; however, in accordance with the generation rule (2-1), the new anchor character string "THE PAGE OF ABC: PRODUCT INFORMATION" is generated as the new anchor character string 100 by combining the character string "THE PAGE OF ABC" of the original anchor with the matched range character string "PRODUCT INFORMATION" via the connection symbol ":" FIG. 11B is an explanatory diagram of a new hypertext 70-2 which is generated based on the new anchor information table 94-1 of FIG. 11A. The anchors thereof are shown in the form of a source sentence in FIG. 11C, wherein the character string "PRODUCT INFORMATION" of the matched range in the original hypertext is replaced by the new anchor character string "THE PAGE OF ABC: PRODUCT INFORMATION", and wherein a new anchor 102-1 according to the new anchor character string "THE PAGE OF ABC: PRODUCT INFORMATION" is attached thereto. When the new anchor character string is a combination of the original anchor character string and the character string of the matched range as described above, the context relevance between the original anchor and the link destination can be shown as an anchor character string.

Figure 12B:
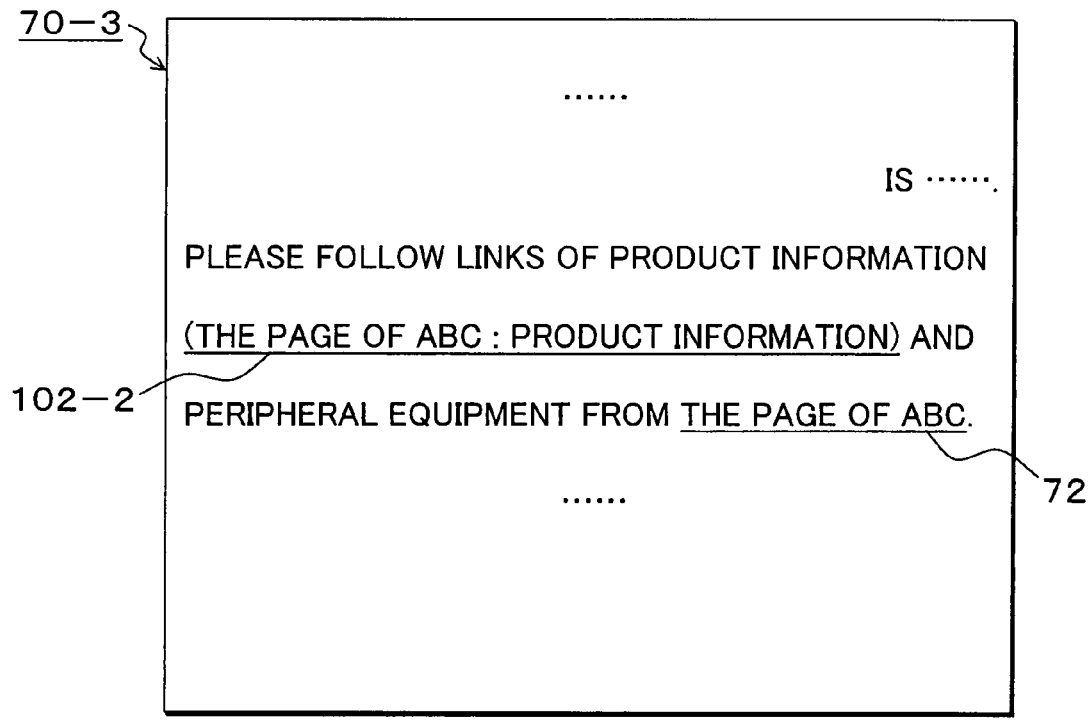
Figure 12C:
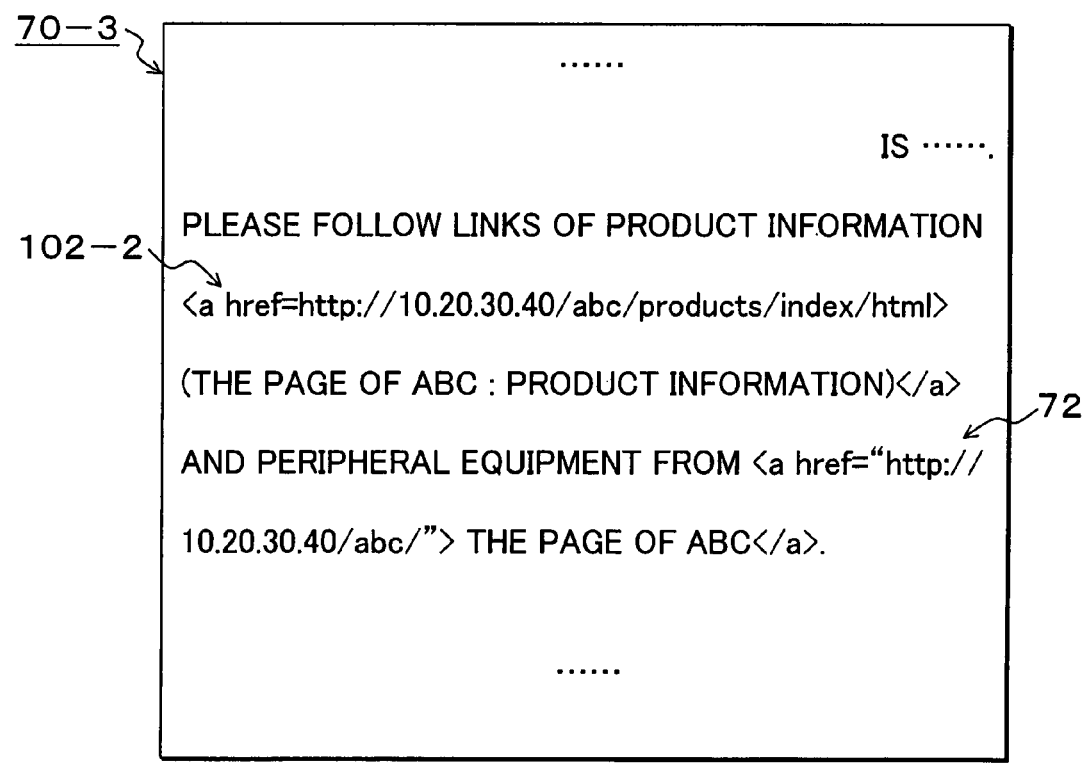

FIGS. 12A to 12C are explanatory diagrams showing generation of a new anchor character string based on the generation rule (2-2). FIG. 12A shows a new anchor information table 94-2 generated by the new anchor attachment unit 46 of FIG. 2. Herein, the matched range 96 and the new link destination URL 98 are the same as those of FIG. 9; however, in accordance with the generation rule (2-2), the original anchor character string "THE PAGE OF ABC" is combined with the matched range character string "PRODUCT INFORMATION" via the connection symbol ":", and a new anchor character string "(THE PAGE OF ABC: PRODUCT INFORMATION)" which is further surrounded by separation symbols, or parentheses, is generated as the new anchor character string 100.

FIG. 12B shows a new hypertext 70-3 generated based on the new anchor information table 94-2 of FIG. 12. The anchors thereof are shown in the form of a source sentence in FIG. 12C, wherein the new anchor character string "(THE PAGE OF ABC: PRODUCT INFORMATION)" is postposed to the character string "PRODUCT INFORMATION" of the matched range in the original hypertext, and wherein a new anchor 102-2 according to the new anchor character string "(THE PAGE OF ABC: PRODUCT INFORMATION)" is attached thereto. Note that the generation rules of the new anchor character string are not limited to the above described ones, and that a character string indicating relevance to the link destination hypertext which is related to the context of an arbitrary original hypertext processing range including an original anchor may be generated and disposed.

Figure 13A:
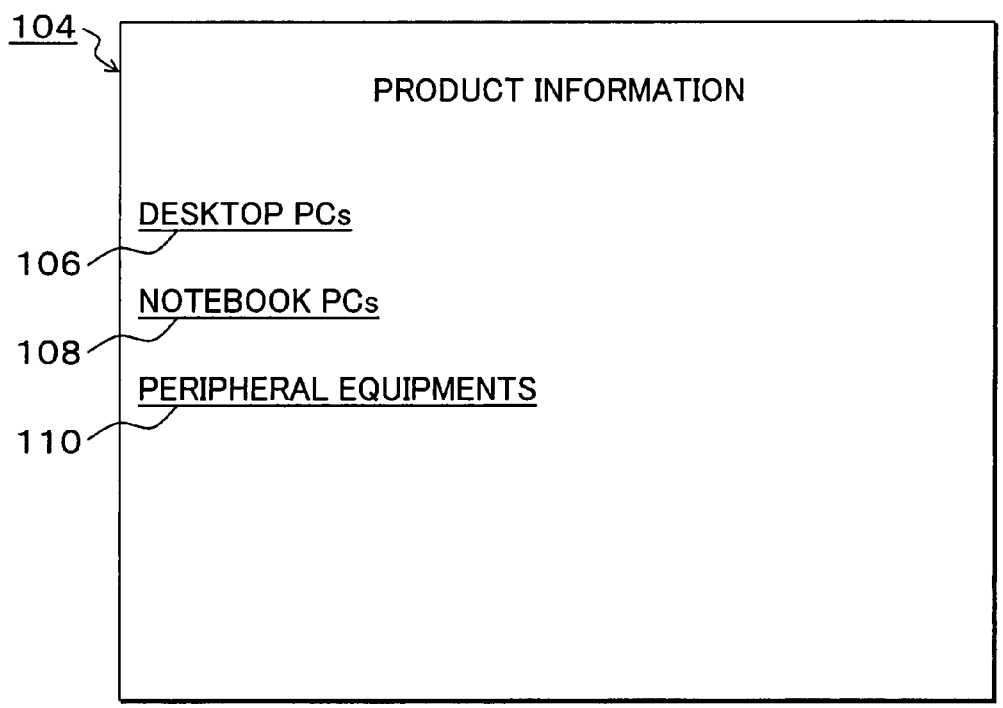
FIGS. 13A and 13B are explanatory diagrams of a link destination hypertext acquired by a recursive processing of the present embodiment.
Figure 13B:
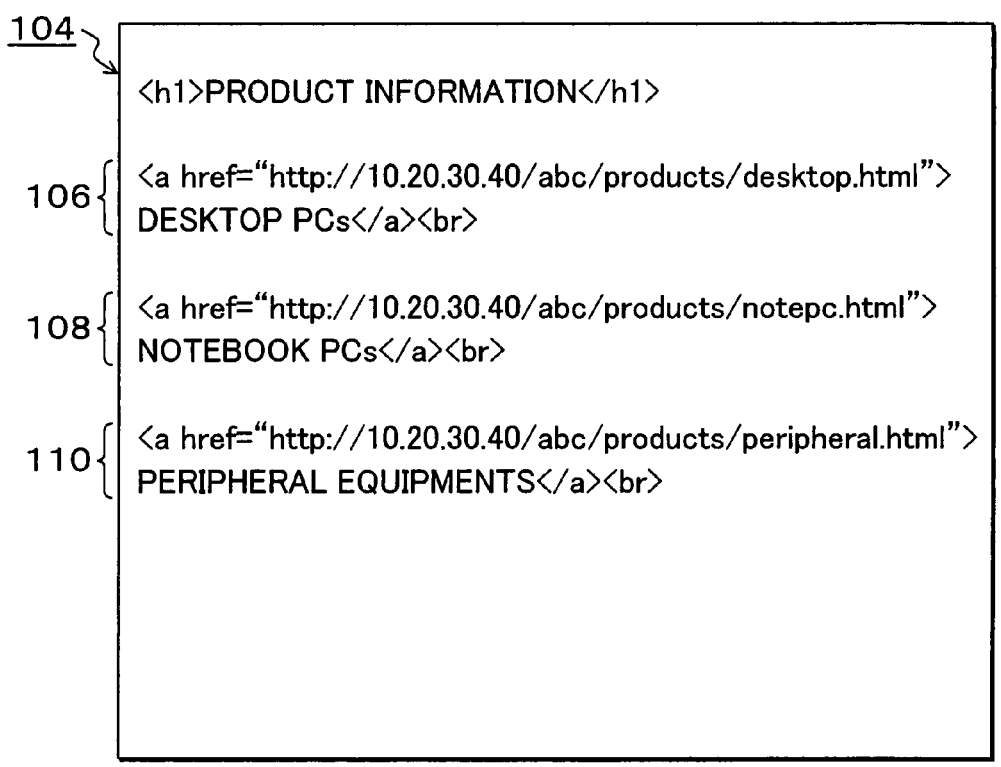

FIGS. 13A and 13B are explanatory diagrams of the link destination hypertext acquired by the recursive processing unit 48 of FIG. 2. Since the registration contents of the new anchor information table 94 shown in FIG. 9 have been obtained by the anchor information generation unit 44 in the first process, the recursive processing unit 48 considers the new anchor information registered in the table as an original anchor and acquires a link destination hypertext 104 of FIG. 13A according to the new link destination URL in the new anchor information of the original anchor. The link destination hypertext 104 acquired by the recursive processing includes three link destination anchors 106, 108 and 110. FIG. 13B shows the link destination anchors 106, 108 and 110 of the link destination hypertext 104 in the form of source sentences. Subsequently, with respect to the source sentences of the link destination anchors 106, 108 and 110 in the link destination hypertext 104 acquired by the recursive process, a link destination anchor information table 88 similar to that shown in FIG. 8 is generated for the character strings "DESKTOP PCs", "NOTEBOOK PCs" and "PERIPHERAL EQUIPMENTS" of the link destination anchors; the range of "PERIPHERAL EQUIPMENTS" is acquired as the matched range through the character string comparison of the processing range in the original hypertext 70 of FIGS. 4A and 4B; as a result, new anchor information is obtained which is composed of a pair of the matched range "PERIPHERAL EQUIPMENTS" and the link destination URL shown in the link destination anchor 110 corresponding to "PERIPHERAL EQUIPMENTS" of FIGS. 13A and 13B and which is similar to that of the new anchor information table 92 of FIG. 9; and, finally, a new hypertext 70-4 shown in FIGS. 14A and 14B is generated.

Figure 14A:
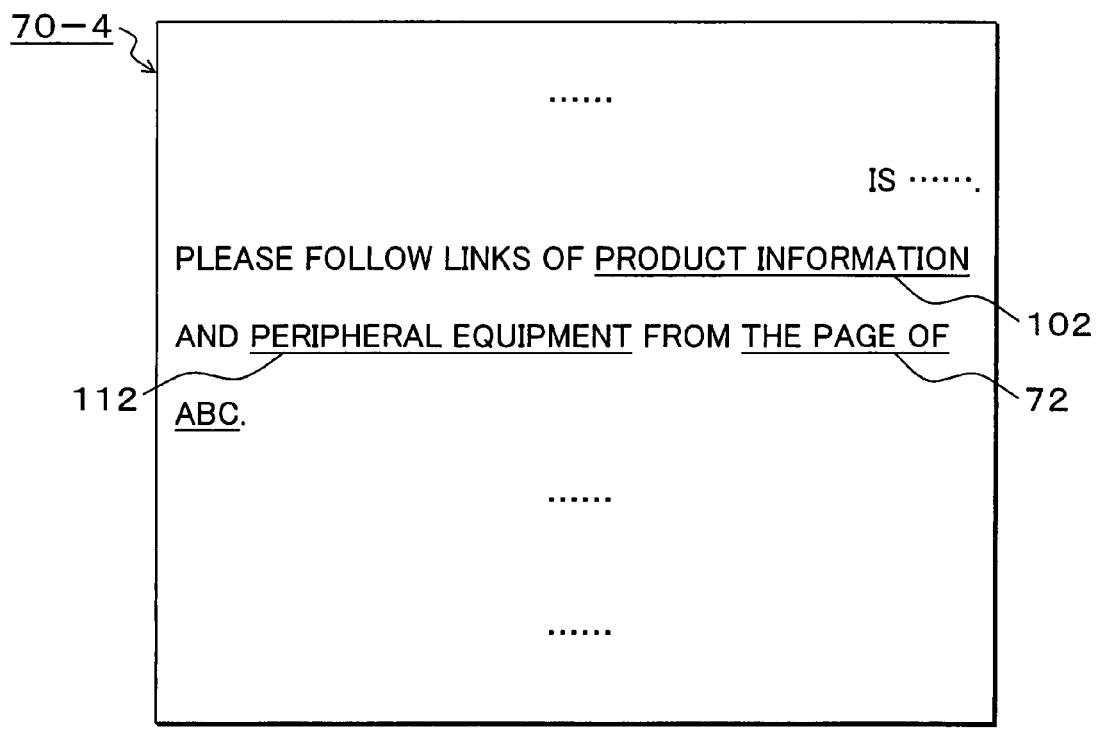
FIGS. 14A and 14B are explanatory diagrams of a new hypertext to which new anchors generated from the link destination hypertext of FIGS. 13A and 13B are attached.
Figure 14B:
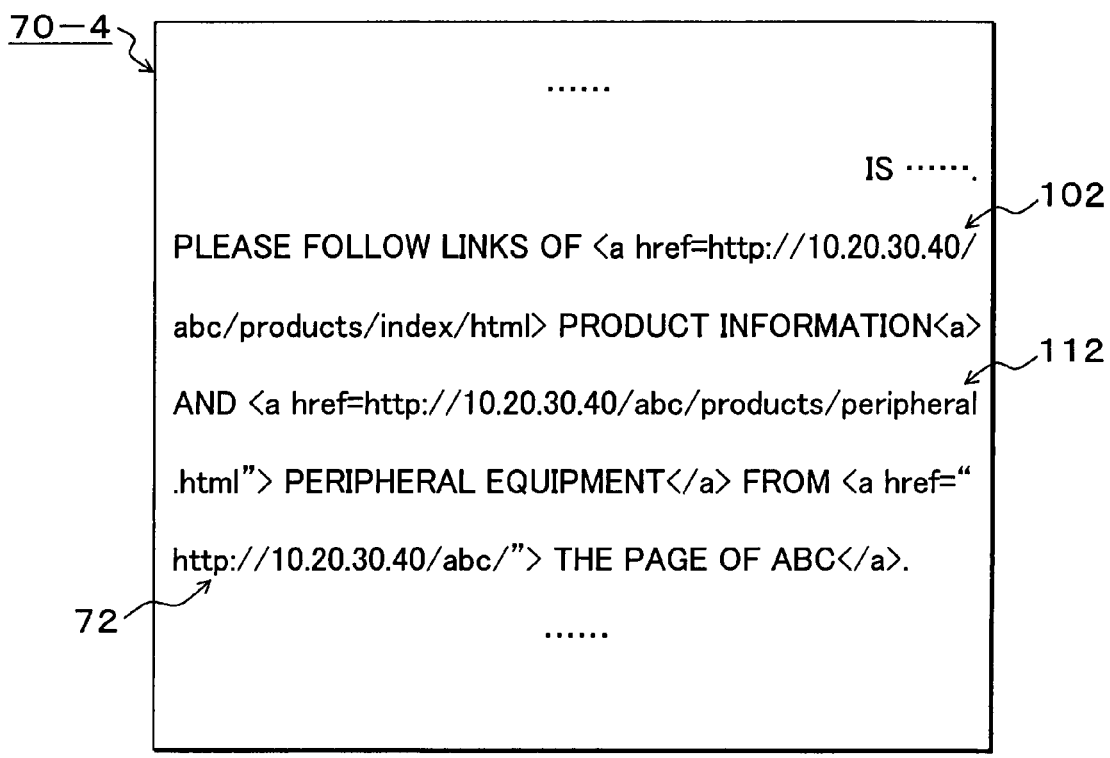

In the new hypertext 70-4 of FIG. 14A, subsequent to the new anchor 102 which has been obtained in the first process, a new anchor 112 is set at "PERIPHERAL EQUIPMENTS" in the second process. FIG. 14B show the anchors of the new hypertext 70-4 in the form of a source sentence, wherein, in the new anchor 112 obtained in the second process, the URL of the link destination anchor "PERIPHERAL EQUIPMENTS" of FIG. 13B is described as a link destination.

Figure 15:
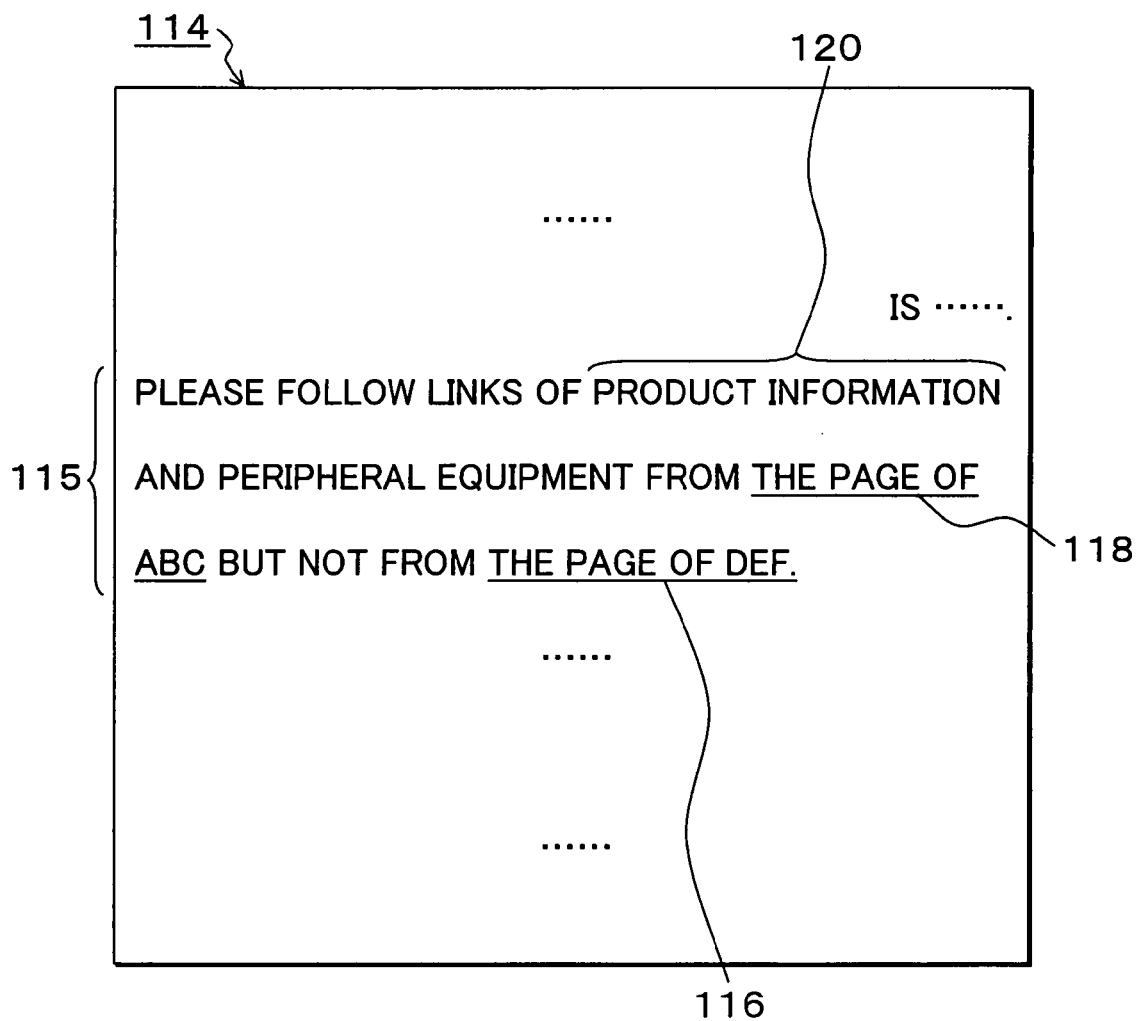
FIG. 15 is an explanatory diagram of an original hypertext in which two original anchors are present in a processing range.

FIG. 15 is an explanatory diagram of a hypertext conversion process according to the present embodiment in the case in which two original anchors are present in a processing range of an original hypertext. In the original hypertext 114 of FIG. 15, two original anchors 116 and 118 are present in the processing range 115. When a process is performed for the processing range 115 by the hypertext conversion unit 24 of FIG. 2, the matched ranges 120 of new anchor information generated for link destination hypertexts acquired from both the original anchor 116 "THE PAGE OF DEF" and the original anchor 118 "THE PAGE OF ABC" are in some cases the same, herein "PRODUCT INFORMATION" in the processing range 115. When the matched ranges of the new anchor information obtained from the two original anchors 116 and 118 are the same, the distances from the original anchors 116 and 118 to the matched range 120 are obtained to set priorities in the order of closer distances, and a new anchor is attached based on the new anchor information obtained from the link destination hypertext of the original anchor 118 having the highest priority. Note that, though the distances from the original anchors to the matched range are used in determination of the priorities in the present embodiment, other criteria such as similarity between the URLs of the original hypertext and the new link destination may be used for priorities.

Figure 17:
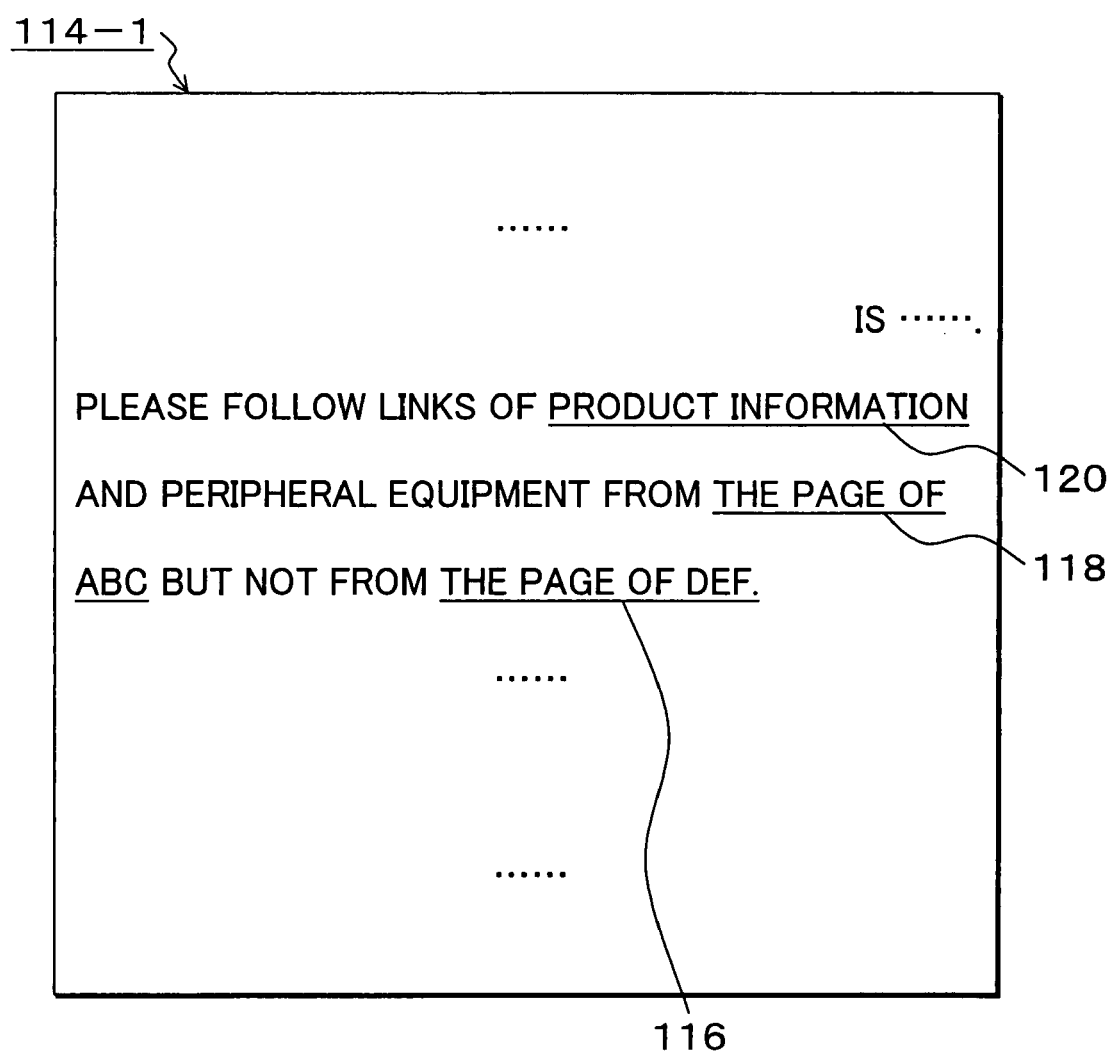
FIG. 17 is an explanatory diagram of a new hypertext to which a new anchor is attached from the new anchor information table of FIG. 16 in accordance with priority.

FIG. 16 shows a new anchor information table 122 which registers new anchor information respectively generated from the link destination hypertexts of the two original anchors 116 and 118 of FIG. 15. In the new anchor information table 122, the first row is the new anchor information for the original anchor 116 and the second row for the next original anchor 118, both of them having the same matched range 124 "From: 306, To 325". Here, the highest priority 1 is set for the second row corresponding to the original anchor 118 having the distance closer to the matched range 120 in the original hypertext 114 of FIG. 15, and a priority 2 for the original anchor 116 having the longer distance. If the two pieces of new anchor information having the same matched range are generated in this manner, as shown in new hypertext 114-1 of FIG. 17, according to the new anchor information of the second row having a higher priority in the new anchor information table 122, a new anchor 120 which describes the new link destination URL "http://10.20.30.40/abc/products/index.html" with a priority 1 is attached to the matched range "PRODUCT INFORMATION". Here, the new anchor character string is generated according to the generation rule (1).

Figure 18A:
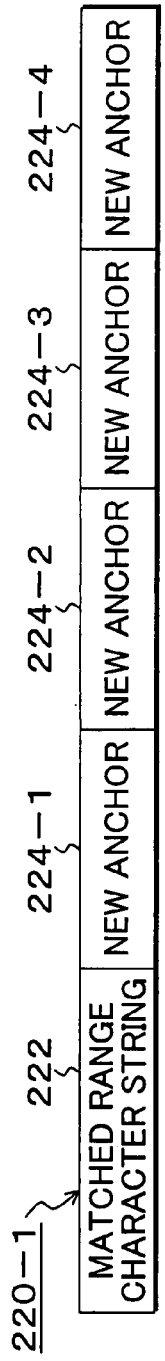
FIGS. 18A to 18E are explanatory diagrams showing attaching methods of new anchor groups in the case in which a plurality of new link destination URLs having the same matched range are present in a new anchor information table.

FIGS. 18A to 18E show the process of attaching a new anchor group in the case where a plurality of original anchors are present in a processing range of an original hypertext and where a plurality of pieces of new anchor information of the same matched range are obtained from link destination hypertexts of these original anchors. In order to attach a plurality of new anchors to a single matched range, new anchors are attached to new anchor character strings generated in accordance with the generation rule (1), (2-1), or (2-2), respectively, and they are arranged in order and replaced by the character string of the matched range; alternatively, other methods may be used such as preposing or postposing them to the character string of the matched range and displaying a plurality of new anchors as a menu in another screen. The diagrams of FIGS. 18A to 18E take, as an example, the case in which four pieces of new anchor information having the same matched range are obtained in the new anchor information table 122. In FIG. 18A, as a new anchor group 220-1, all of four generated new anchors 224-1 to 224-4 are attached to a matched range character string 222. In this case, priorities are not set for the four new anchors 224-1 to 224-4, and the anchors are simply arranged, for example, in the generation order.

Figure 18B:
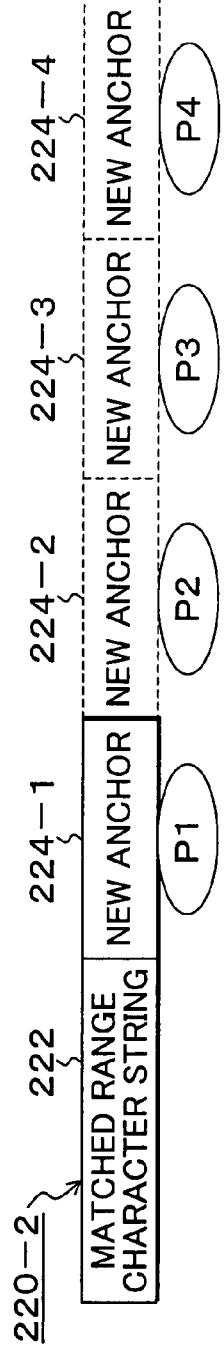
Figure 18C:
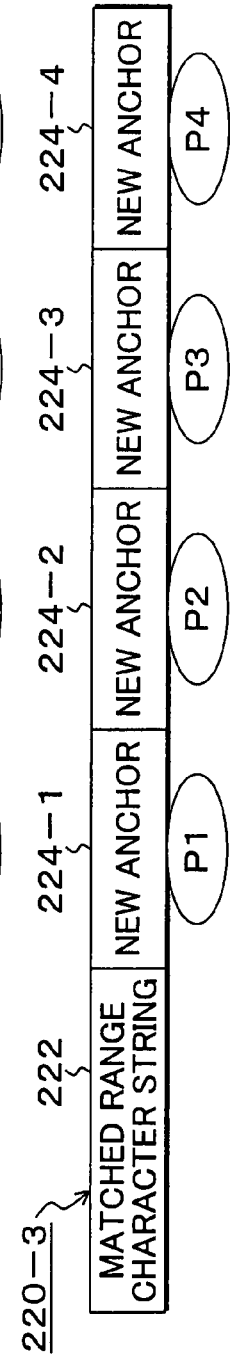
Figure 18D:
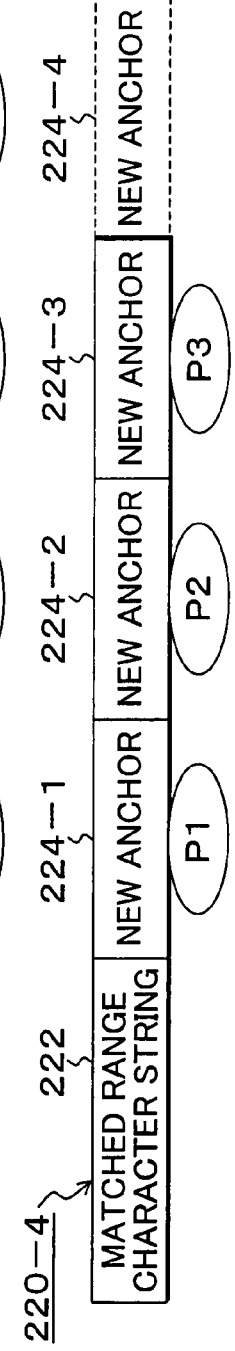
Figure 18E:
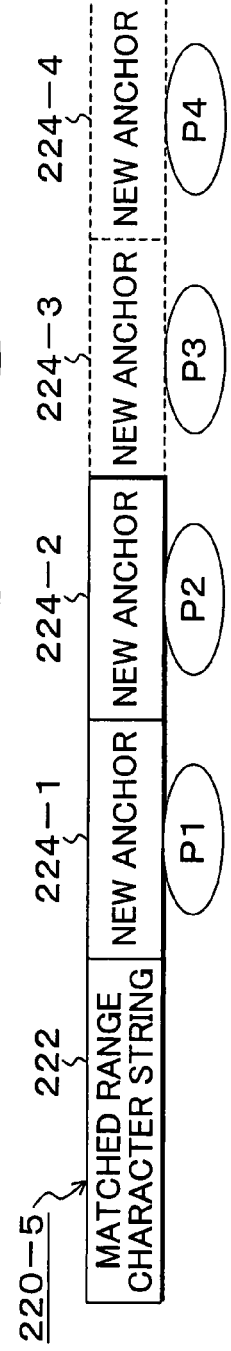

FIGS. 18B to 18D show the case in which the first to fourth priorities P1 to P4 are given to the four generated new anchors 224-1 to 224-4 in accordance with the distances from the matched range character string to the original anchors.

FIG. 18B shows the new anchor group 220-2 in which the new anchor 224-1 having the highest priority P1 is attached to the matched range character string 222. In the new anchor group 220-3 of FIG. 18C, the four new anchors 224-1 to 224-4 are arranged in the order of the priorities P1 to P4 and attached to the matched range character string 222. In the new anchor group 220-4 of FIG. 18D, those having priorities equal to or higher than a predetermined threshold value, for example, the new anchors 224-1 to 224-3 having priorities equal to or higher than P3, are arranged in the order of the priorities and attached to the matched range character string 222. Furthermore, in the new anchor group 220-5 of FIG. 18E, a predetermined number of new anchors, for example, the new anchors 224-1 to 224-2, the number of which is two, are arranged in the order of the priorities and attached to the matched range character string 222. As described above, in the case in which a plurality of pieces of anchor information having the same matched range are generated, the conversion to a new hypertext can be carried out by attaching them to the original hypertext in accordance with any of the rules of FIGS. 18A to 18E.

Figure 19A:
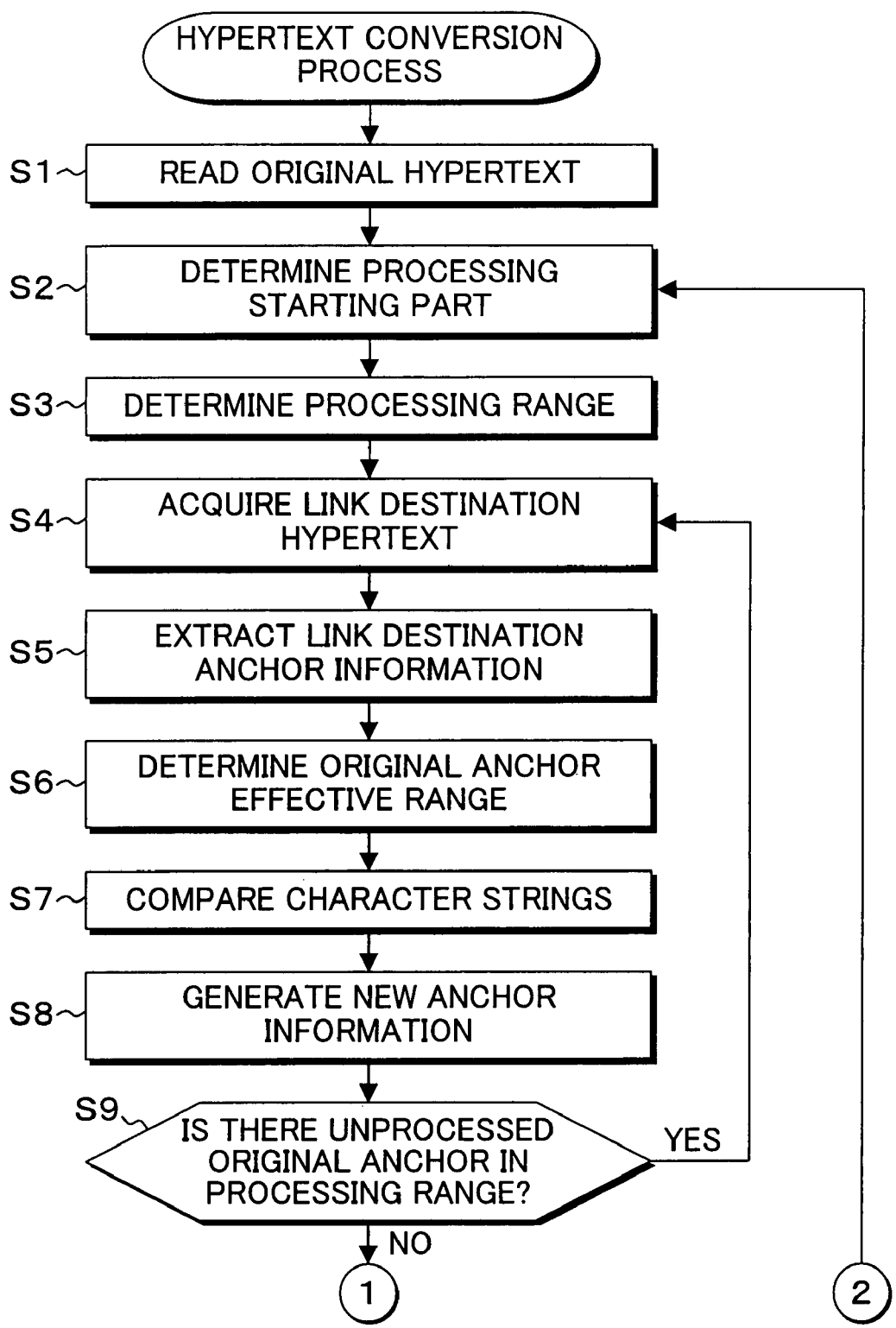
FIGS. 19A and 19B are flow charts showing a hypertext conversion process according to the present embodiment.
Figure 19B:
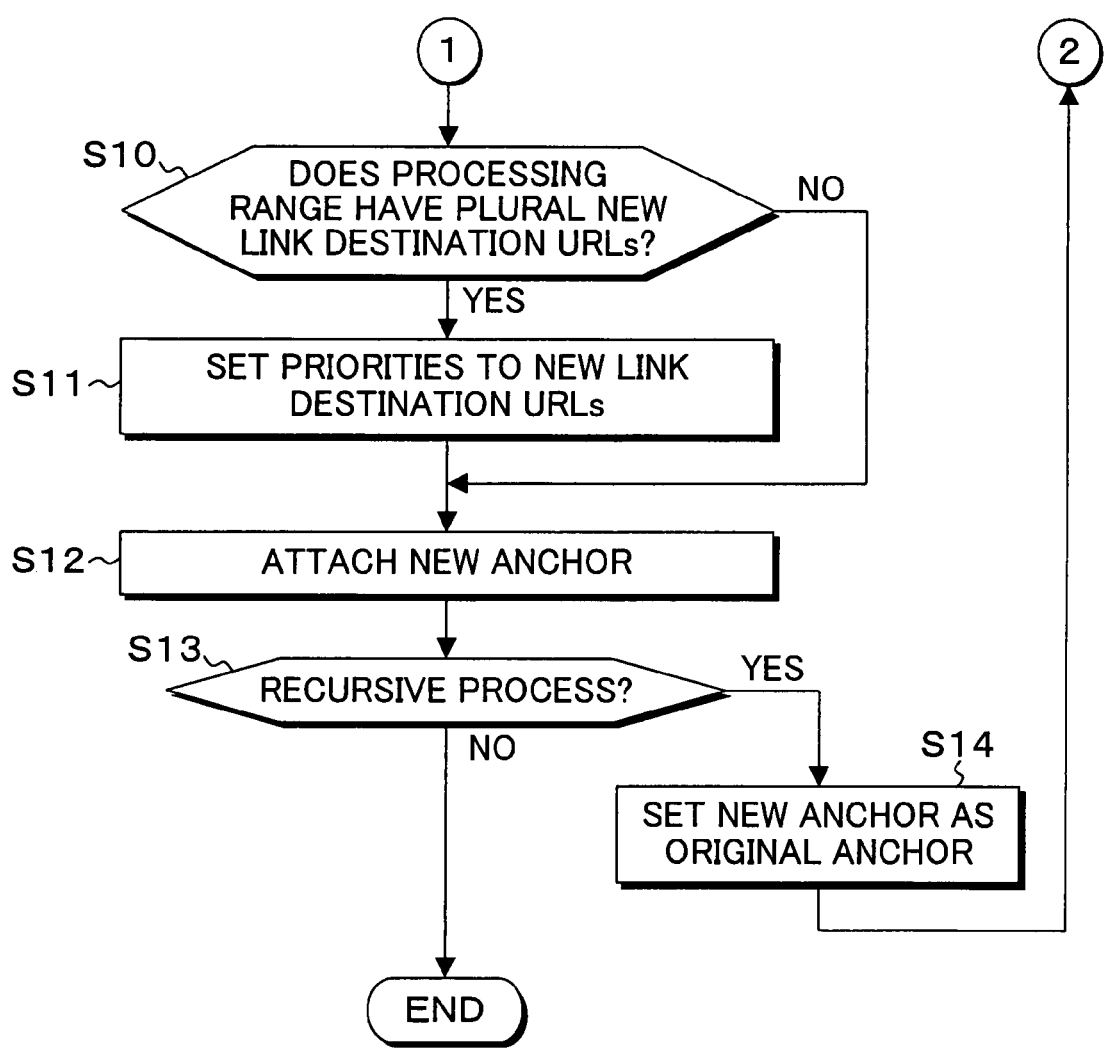

FIGS. 19A and 19B are flow charts showing the hypertext conversion process according to the present embodiment, which is explained as follows by reference to FIG. 2. In the hypertext conversion process of FIGS. 19A and 19B, at step S1, a hypertext is read which is acquired for example by the proxy processing unit 30 in a substitutional process of a browsing request from the client side; and, at step S2, the processing part determination unit 32 determines a processing starting part using, for example, complete matching with the patterns registered in the pattern definition table 76 shown in FIG. 5. Next, at step S3, the processing range determination unit 34 determines a processing range which includes the processing starting part and, for example, which is separated by a punctuation mark. At step S4, the link destination hypertext acquisition unit 36 selects one original anchor present in the processing range, and acquires a link destination hypertext. Next, at step S5, the link destination anchor information extraction unit 38 extracts link destination anchor information such as that shown in the link destination anchor information table 88 of FIG. 8 through analysis of the source sentences of link destination anchors present in the link destination hypertext. At step S6, the original anchor effective range determination unit 40 determines an original anchor effective range, which serves as a candidate character string range to which a new anchor is added in the original hypertext, based on the link destination anchor information. Next, at step S7, the character string comparison unit 42 compares the original anchor effective range with anchor character strings in the link destination anchor information, and acquires as a matched range a character string in the original hypertext, which is obtained, for example, by complete matching of the character strings. Next, at step S8, the new anchor information generation unit 44 generates new anchor information such as that shown in the new anchor information table 94 of FIG. 9, which is composed of a pair of the matched range and the link destination URL of the link destination hypertext. Next, at step S9, checking is made whether or not there is an unprocessed original anchor in the processing range of the original hypertext; and, if there is, the process proceeds to step S4 and the processes from step S4 are repeated for the next original anchor. Therefore, the new anchor information is generated for each original anchor at step S9. If there is no more unprocessed original anchor at step S9, the process proceeds to step S10, wherein determination is made whether or not new anchor information having the same matched range and a plurality of new link destination URLs are present in the generated new anchor information. If there is only one new link destination URL of the same matched range, the process proceeds to step S12; if there are a plurality of URLs, the process proceeds to step S11, wherein priorities are set for the new link destination URLs based on for example the distances from the character string of the matched range to the original anchors. Subsequently, at step S12, a new anchor based on the new anchor information is attached to the original hypertext to generate a new hypertext. Next, the process proceeds to step S13, wherein checking is made whether or not a recursive processing is set as a processing mode. If it is, the new anchor in the new hypertext, specifically, the new anchor information corresponding to the new anchor is set as an original anchor, the process then returns to step S2, and the same processes are repeated for the newly set original anchor. If it is checked at step S13 that the recursive processing is set to off, that the number of times of the recursive processing has reached a predetermined number of times, that other predetermined conditions are satisfied, or that attachment of the new anchor to the original hypertext is not performed, the series of processes is terminated. Herein, if the hypertext conversion unit 24 according to the present embodiment is provided in the proxy cache server 14 of FIG. 1, the link destination hypertext acquired by the link destination hypertext acquisition unit 36 of FIG. 2 is saved in the cache 26 with an effective period specified, and so is the new hypertext generated by the hypertext conversion unit 24 in the same manner. As a result, if the corresponding new hypertext is present in the cache 26 when browsing of the original hypertext is requested from the client, the new hypertext saved in the cache 26 can be provided to the client without executing the hypertext conversion process according to the present embodiment, which thus leads to a reduced processing load of the proxy cache server 14 and a shorter response time of the client.

Figure 21A:
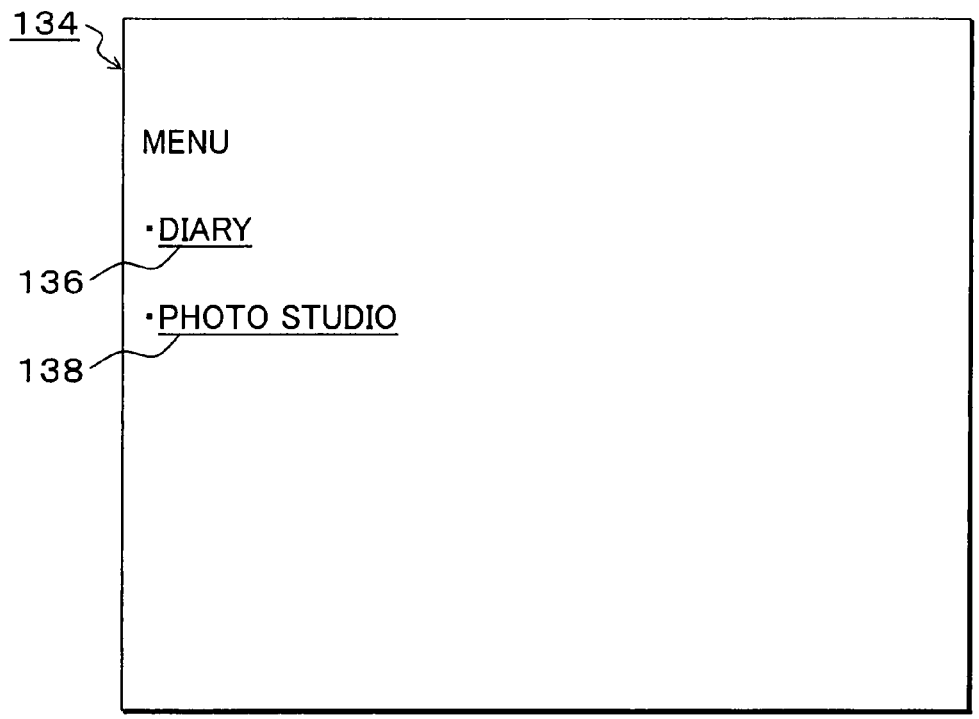
FIGS. 21A and 21B are explanatory diagrams of a link destination hypertext which is a top page acquired from the original anchor of FIGS. 20A and 20B.
Figure 21B:
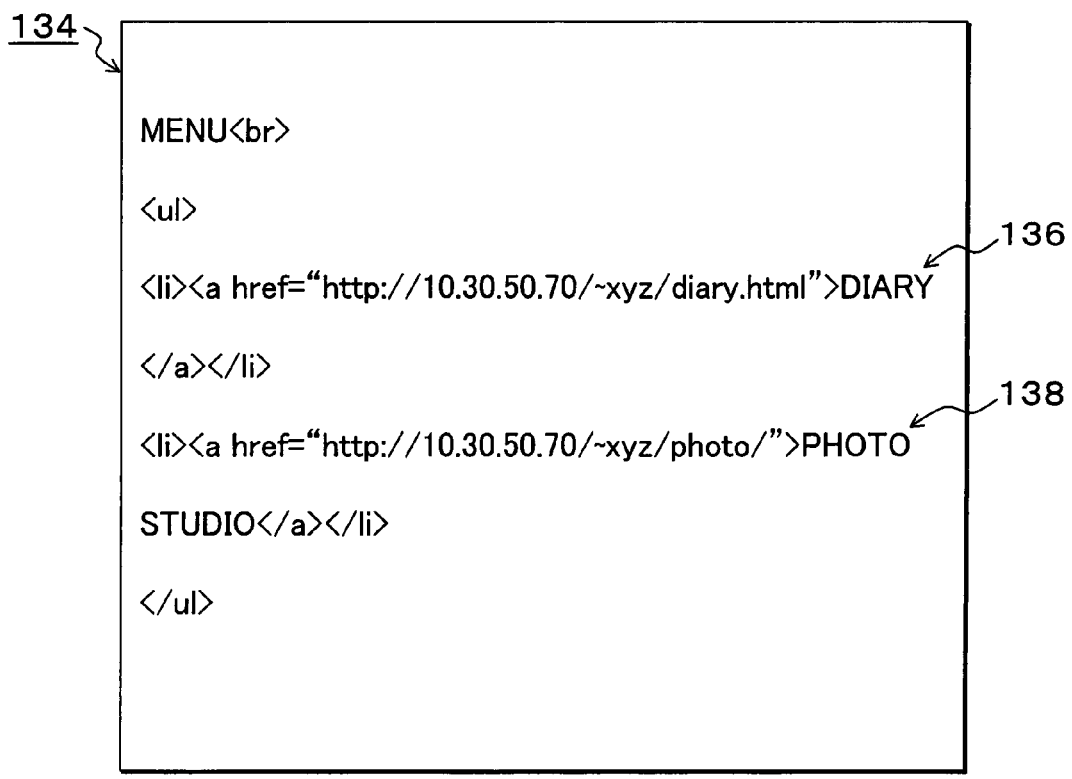
Figure 24A:
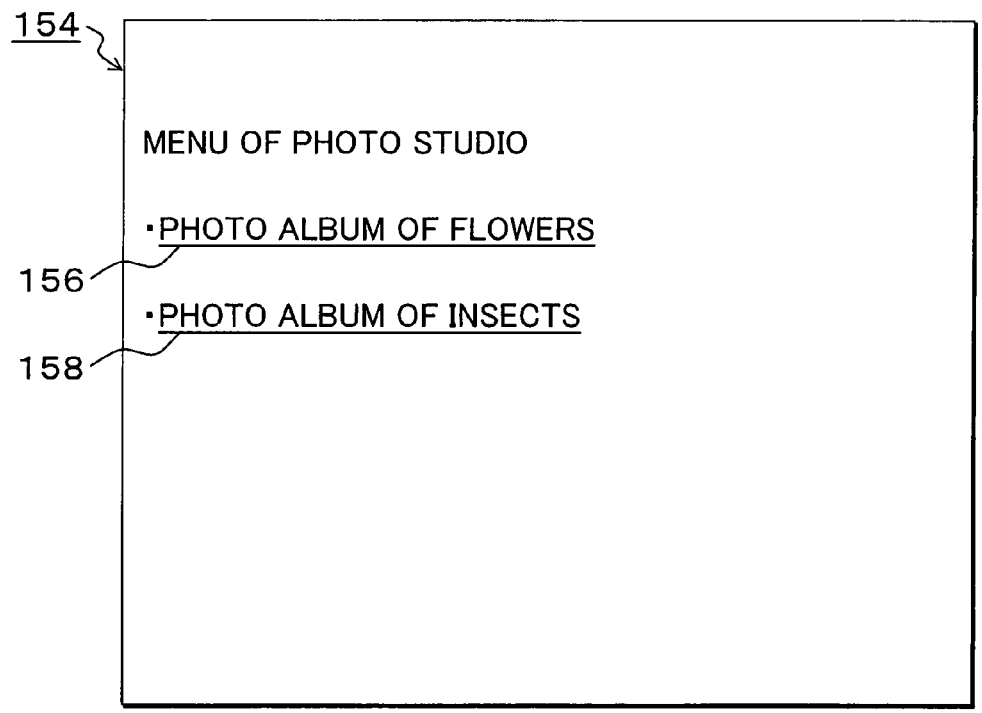
FIGS. 24A and 24B are explanatory diagrams of a link destination hypertext acquired by using "PHOTO ALBUM" of FIGS. 21A and 21B as an original anchor.

FIGS. 20A and 20B are explanatory diagrams showing a special original hypertext to be subjected to a process according to another embodiment of the present invention. In FIG. 20A the original hypertext 130 has a title "UPDATE HISTORY" and the original anchor 132 is "RETURN TO TOP PAGE". FIG. 20B shows source sentences of the original hypertext 130. In determination of a special page such as that of the original hypertext 130 shown in FIG. 20A, for example, title patterns such as (1) UPDATE HISTORY, and
(2) NEW INFORMATION are determined in advance for the title, and the pages matched with the title patterns are determined as special pages. When the page is determined as a special page, an original anchor is determined based on the predefined anchor conditions. As the anchor definition conditions for determining an original anchor, for example, (1) TOP PAGE,
(2) TOP, and
(3) HOMEPAGE are set. Furthermore, the entire original hypertext 130 is set as an original anchor effective range in the determined special page of FIGS. 20A and 20B. The hypertext conversion process for the special page is effective, for example, when the information written in the original hypertext indicates that one should follow links from a top page. The processing starting part determination unit 32 and the processing range determination unit 34 of the hypertext conversion unit 24 of FIG. 2 consider the entire original hypertext 130 as a processing range with respect to special pages like that shown in FIGS. 20A and 20B; and a link destination hypertext 134 which serves as a top page as shown in FIG. 21A is acquired by the link destination hypertext acquisition unit 36 from the URL of the original anchor 132. In the link destination hypertext 134 which serves as a top page, "DIARY" and "PHOTO STUDIO" are set as a link destination anchor 136 and a link destination anchor 138, respectively. FIG. 21B shows the link destination hypertext 134 in the form of source sentences. Next, the character string comparison unit 42 of FIG. 2 compares the link destination anchor character strings 142 of a link destination anchor information table 140 of FIG. 22 with the character strings of the original hypertext 130 of FIGS. 20A and 20B, to find out that "DIARY" and "PHOTO STUDIO" are matched. As a result, the range information "From: 574, To: 579" and "From: 515, To: 527" of "DIARY" and "PHOTO STUDIO", respectively, are acquired as matched ranges. Next, the new anchor information generation unit 44 of FIG. 2 generates a new anchor information table 146 shown in FIG. 23. As in the case of the generation of the new anchor information table 94 of FIG. 9, link destination URLs 144 of the link destination anchors obtained from the link destination anchor information table 140 of FIG. 22 are stored in the new anchor information table 146 as new link destination URLs 150. For convenience of explanation, new anchor character strings 152 are disposed in FIG. 23, like in FIG. 9. Next, the recursive processing unit 48 considers the new anchor information corresponding to, for example, "PHOTO STUDIO" of the new anchor information table 146 of FIG. 23 as an original anchor, repeats the processes from that of the processing starting part determination unit 32 of FIG. 2, and acquires a link destination hypertext 154 of FIG. 24A from the link destination URL corresponding to "PHOTO STUDIO" of FIG. 22. In the link destination hypertext 154 acquired in the second process, "PHOTO ALBUM OF FLOWERS" and "PHOTO ALBUM OF INSECTS" are set as a link destination anchor 156 and a link destination anchor 158, respectively.

Figure 24B:
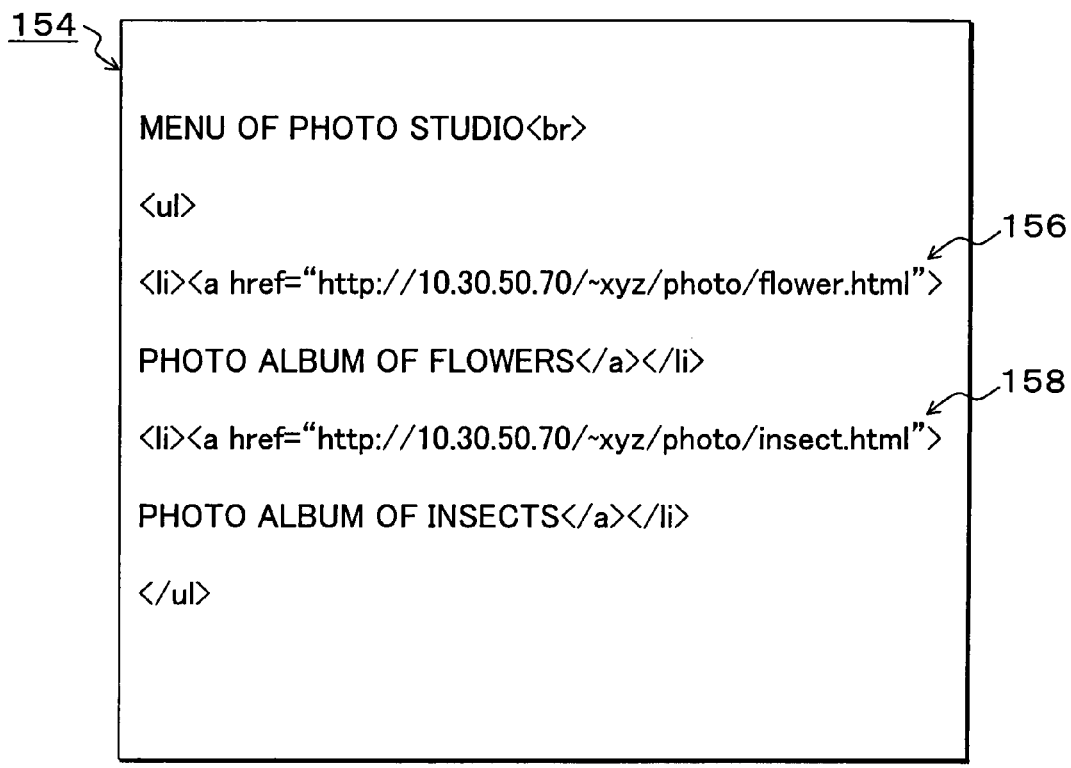

FIG. 24B shows source sentences of the link destination hypertext 154 in the second process. When the source sentences are analyzed, a link destination anchor information table 160 of FIG. 25 is obtained.

Then, when the link destination anchor information character strings 162 "PHOTO ALBUM OF FLOWERS" and "PHOTO ALBUM OF INSECTS" registered in the link destination anchor information table 160 of FIG. 25 are subjected to character string comparison with the original hypertext 130 of FIGS. 20A and 20B, the character string "PHOTO ALBUM OF FLOWERS" is matched completely; thus, it is set as a matched range, and a new anchor information table 166 of FIG. 26 is generated in which a link destination URL 164 of "PHOTO ALBUM OF FLOWERS" of the link destination anchor information table 160 serves as a new link destination URL 170.

Figure 27A:
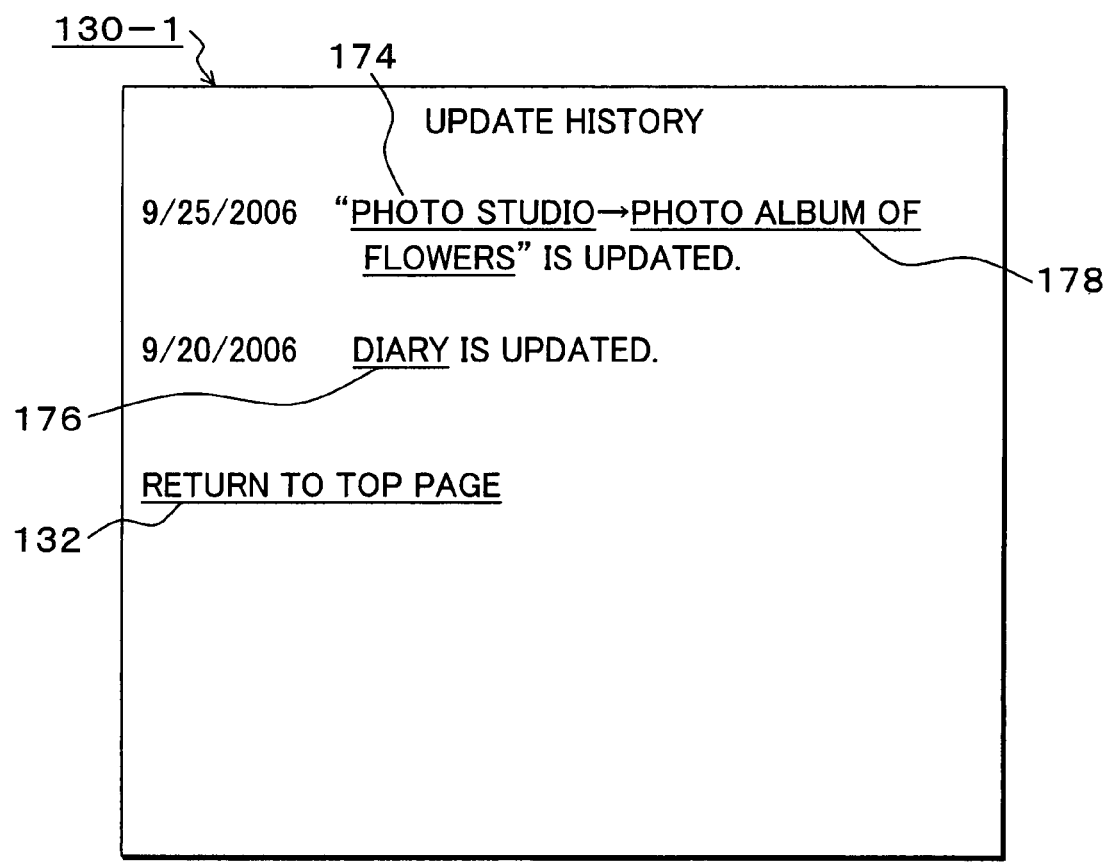

FIGS. 27A and 27B show a converted new hypertext 130-1 wherein new anchors are attached to the original hypertext 130 of FIGS. 20A and 20B according to the new anchor information table 146 of FIG. 23 and the new anchor information table 166 of FIG. 26. In the new hypertext 130-1 of FIG. 27A, new anchors 174 and 176 are attached to "PHOTO STUDIO" and "DIARY" according to the two pieces of new anchor information of the new anchor information table 146 of FIG. 23. Furthermore, a new anchor 178 is attached to "PHOTO ALBUM OF FLOWERS" according to the new anchor information of the new anchor information table 166 of FIG. 26.

FIG. 27B shows source sentences of the new hypertext 130-1, wherein the corresponding new link destination URLs 150 of the new anchor information table 146 of FIG. 23 are described in the new anchors 174 and 176, respectively, and the registration contents of the new link destination URL 170 of the new anchor information table 166 of FIG. 26 is described in the new anchor 178. In this case, the recursive processing is targeted for the link destination hypertext obtained from the link destination anchor 138 "PHOTO STUDIO" of the link destination hypertext 134 of FIG. 21A; similarly, when a recursive processing is performed also for the link destination anchor 136 "DIARY", new relevant link destination anchor information related to the diary can be obtained from the link destination hypertext thereof so as to generate a new hypertext to which new anchors are attached.

Figure 28:
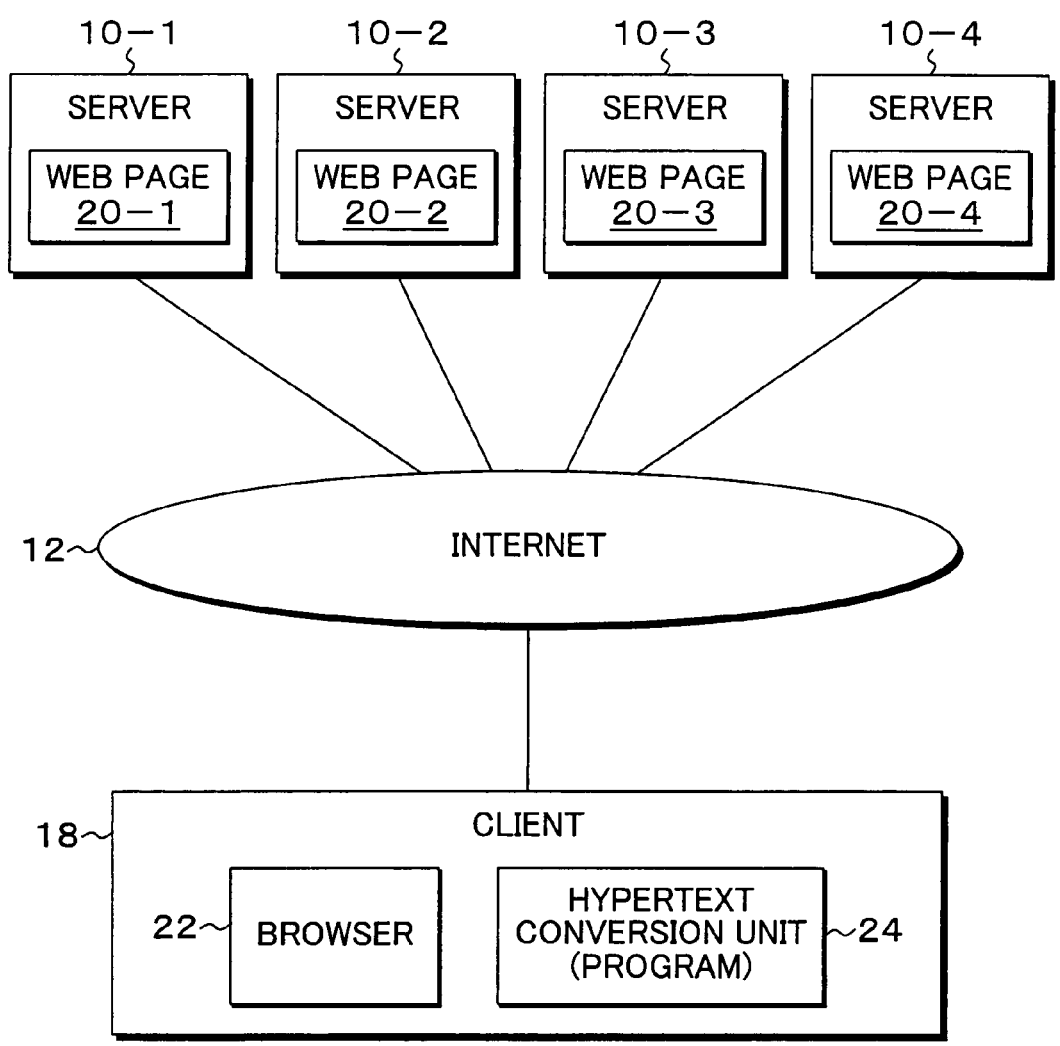
FIG. 28 is a block diagram of a system configuration which executes the hypertext conversion process of the present invention by a client.

FIG. 28 is a block diagram of a system configuration in which the hypertext conversion process according to the present invention is executed by a client. In FIG. 28, a client 18 can acquire and browse a hypertext by accessing the web pages 20-1 to 20-4 of the servers 10-1 to 10-4 via the Internet 12 using the browser 22. In the present embodiment, provided in the client 18 is the hypertext conversion unit 24 having the same function as that provided in the proxy cache server 14 of FIG. 2. Therefore, when browsing a text page of an arbitrary web page using the browser 22 of the client 18, the system of FIG. 28 considers the hypertext received from the server side as an original hypertext and executes the hypertext conversion process according to the present embodiment. In FIG. 28 the client 18 is directly connected to the Internet 12; however, when the hypertext conversion unit 24 according to the present embodiment is provided in each of clients in a system where the clients are connected to the Internet via the proxy cache server 14 as shown in FIG. 1, a link destination hypertext acquired by the link destination hypertext acquisition unit 36 of FIG. 2 is saved in the cache 26 with an effective period specified. In this case, when the hypertext conversion process is thereafter executed by the client upon the browsing request of the same original hypertext, in the process of the link destination hypertext acquisition unit 36 therein, the link destination hypertext saved in the cache 26 can be provided to the client without acquiring the link destination hypertext from the server on the Internet if the link destination hypertext requested by the client is present in the cache 26.

Figure 29:
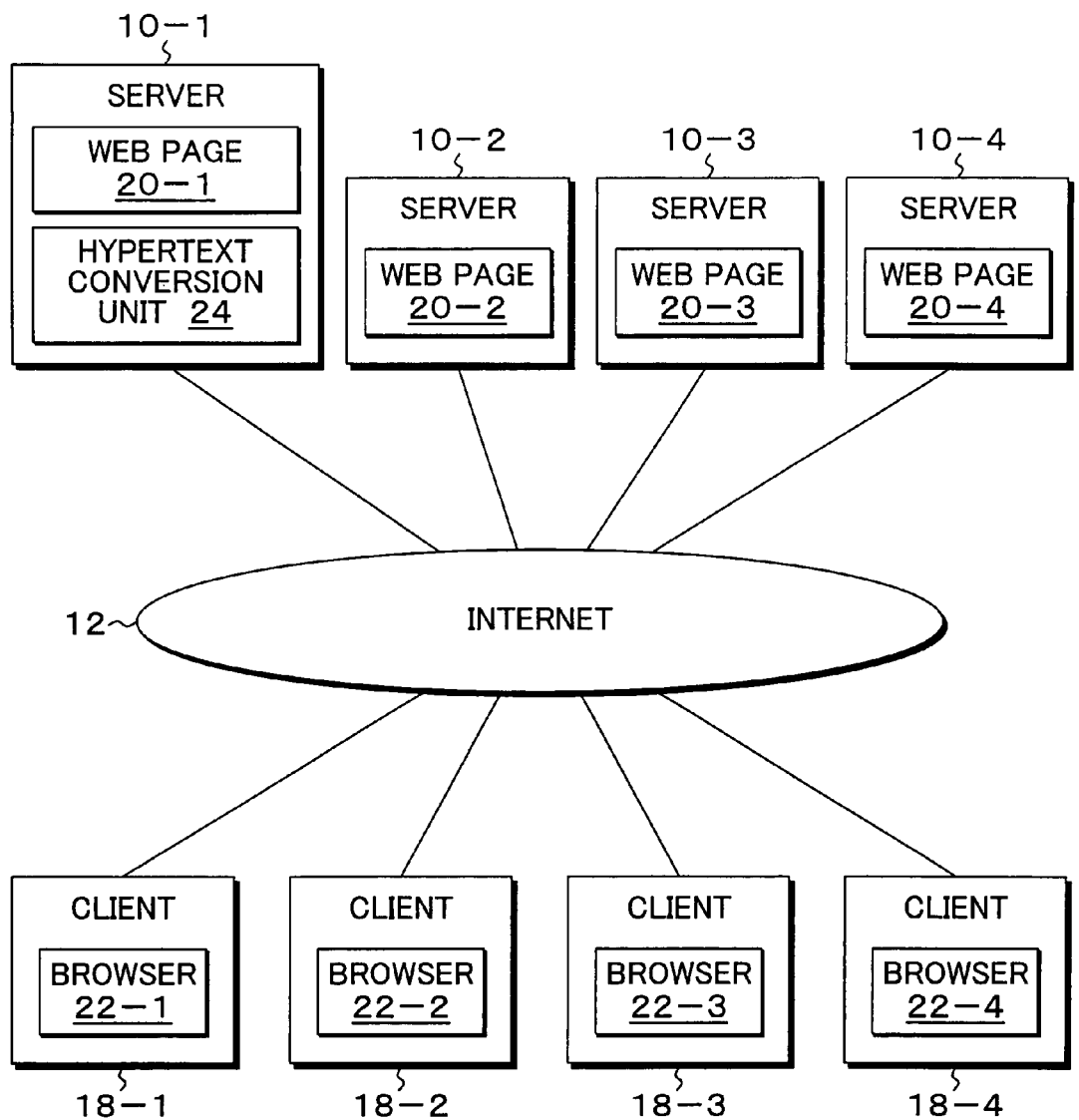
FIG. 29 is a block diagram of a system configuration which executes the hypertext conversion process of the present invention by a web server.

FIG. 29 is a block diagram of a system configuration in which the hypertext conversion process according to the present invention is executed by a web server. In FIG. 28, among the servers 10-1 to 10-4, provided in the server 10-1 are web pages as well as the hypertext conversion unit 24 according to the present embodiment having the same functional configuration as that provided in the proxy cache server 14 of FIG. 1. Therefore, when the server 10-1 receives a browsing request of the web page 20-1 by any of the browsers 22-1 to 22-4 of the clients 18-1 to 18-4, the conversion process by the hypertext conversion unit 24 according to the present embodiment is executed by the server 10-1 per se with respect to the hypertext read from the web page, and the new hypertext generated by the hypertext conversion process is transmitted to and displayed in the client which has requested browsing. Furthermore, as an embodiment of the hypertext conversion unit according to the present invention, the hypertext conversion unit 24 according to the present embodiment can be combined with an editor for creating hypertexts and used as a supporting function of the editor. More specifically, when a hypertext is created with the hypertext editor, the system activates the hypertext conversion unit according to the present embodiment after the creation, considers the created hypertext as an original hypertext, and executes the hypertext conversion process according to the present embodiment, so as to generate a new hypertext and thus perform automatic tuning. Moreover, the present invention provides a recording medium storing the program executed by the proxy cache server 14 of FIG. 1, the client of FIG. 28, or the server of FIG. 29. Herein, examples of the recording medium include portable storage media such as CD-ROM, floppy disk (R), DVD disk, magneto-optical disk and IC card; storage devices such as hard disk drives (HDD) provided inside/outside computer systems; database for retaining the program via a line or other computer systems and database thereof; and online transmission media. Moreover, as shown in the hypertext conversion unit 24 of FIG. 2, the above described embodiments have a functional configuration composed of the processing part determination unit 32, the processing range determination unit 34, the link destination hypertext acquisition unit 36, the link destination anchor information extraction unit 38, the original anchor effective range determination unit 40, the character string comparison unit 42, the new anchor information generation unit 44, the new anchor attachment unit 46, and the recursive processing unit 48; however, other embodiments may be used which have a functional configuration composed of the processing starting part determination unit 32 to the new anchor information generation unit 44 without the new anchor attachment unit 46, wherein the recursive processing unit 48 considers new anchor information as an original anchor and repeats the series of processes. More specifically, when new anchor information can be generated in the processes up to that of the new anchor information generation unit 44, conversion to a new hypertext by attaching new anchors to an original hypertext thereafter can be independently performed in another process; and, when a conversion tool includes merely the processes of the processing starting part determination unit 32 to the new anchor information generation unit 44, it can be brought into existence as conversion program, method and device. Note that the present invention includes arbitrary modifications that do not impair the object and advantages thereof and that it is not limited by the numerical values shown in the above described embodiments.

What is claimed is:

1. A computer-readable storage medium which stores a hypertext conversion program characterized by causing a computer to execute a processing starting part determination step in which a processing starting part is determined in an original hypertext serving as a processing object;

a processing range determination step in which a processing range including an original anchor in the original hypertext is determined based on the processing starting part;

a link destination hypertext acquisition step in which a link destination hypertext of the original anchor present in the processing range is acquired;

a link destination anchor information extraction step in which link destination anchor information composed of a pair of a character string and a link destination URL of a link destination anchor is extracted from the link destination hypertext;

an original anchor effective range determination step in which an original anchor effective range is determined which serves as a candidate character string range to which a new anchor is added in the original hypertext;

a character string comparison step in which a character string present in the original anchor effective range is compared with the character string present in the link destination anchor information, and in which a matched range in the original anchor effective range is determined;

a new anchor information generation step in which the link destination URL paired with the link destination character string of the link destination anchor information which is matched in the character string comparison is set as a new link destination URL, and in which new anchor information is generated composed of a pair of the matched range and the new link destination URL; and a new anchor attachment step in which a new anchor describing the new link destination URL in the new anchor information is attached to a character string of the original hypertext present in the matched range in the new anchor information, so as to convert the original hypertext to a new hypertext.

2. The storage medium according to claim 1, characterized in that, in the new anchor attachment step, the character string of the matched range is set as a new anchor character string of the new anchor.

3. The storage medium according to claim 2, characterized in that, in the new anchor attachment step, a combination character string in which the original anchor character string is combined with the character string of the matched range is generated as a new anchor character string of the new anchor.

4. The storage medium according to claim 2, characterized in that, in the new anchor attachment step, a character string in which the original anchor character string is combined with the matched range character string via a predetermined connection symbol, or a character string in which the original anchor character string is combined with the matched range character string via a predetermined connection symbol, and is further surrounded by predetermined separation symbols is generated as a new anchor character string.

5. The storage medium according to claim 1, characterized by further including a recursive processing step in which the new anchor information generated in the new anchor information generation step is considered as an original anchor in the original hypertext, and the processes of the processing starting part determination step, the processing range determination step, the link destination hypertext acquisition step, the link destination anchor information extraction step, the anchor effective range determination step, the character string comparison step, and the new anchor information generation step are recursively executed.

6. The storage medium according to claim 1, characterized by further including a recursive processing step in which the new anchor information generated in the new anchor information generation step is considered as an original anchor in the original hypertext, and the processes of the processing starting part determination step, the processing range determination step, the link destination hypertext acquisition step, the link destination anchor information extraction step, the anchor effective range determination step, the character string comparison step, the new anchor information generation step, and the new anchor attachment step are recursively executed.

7. The storage medium according to claim 1, characterized in that, in the processing starting part determination step, a character string matched with a predetermined character string pattern indicating a link which is present in the vicinity of the original anchor character string present in the original hypertext is searched for and determined as the processing starting part.

8. The storage medium according to claim 1, characterized in that, in the processing range determination step, a sentence which includes the original anchor character string present in the original hypertext and the processing starting part and which is separated by a punctuation mark, a block which includes the original anchor character string and the processing starting part and which is separated by a predetermined block separation symbol, or the entire original hypertext is determined as the processing range.

9. The storage medium according to claim 1, characterized in that, in the original anchor effective range determination step, a sentence which includes the original anchor character string and which is separated by a punctuation mark, a block which includes the original anchor character string and which is separated by a predetermined block separation symbol, or the entire original hypertext is determined as an original anchor effective range.

10. The storage medium according to claim 1, characterized in that, in the new anchor information generation step, when a plurality of new link destination URLs correspond to the same matched range in the new anchor information, priorities are given to the plurality of new link destination URLs.

11. The storage medium according to claim 1, characterized in that, in the new anchor attachment step, when a plurality of new link destination URLs correspond to the same matched range of the new anchor information, a plurality of new anchors corresponding to the plurality of new link destination URLs are attached to the matched range in the original hypertext.

12. The storage medium according to claim 1, characterized in that, in the new anchor information generation step, when a plurality of new link destination URLs correspond to the same matched range of the new anchor information, priorities are given to the new link destination URLs; and, in the new anchor attachment step, a plurality of new anchors corresponding to the plurality of new link destination URLs are attached to the matched range in the original hypertext based on the priorities.

13. The storage medium according to claim 12, characterized in that, in the new anchor attachment step, a process of attaching the new anchor having the highest priority, a process of attaching the plurality of new anchors in the order of the priorities, a process of attaching the new anchor having the priority higher than a predetermined threshold value, or a process of attaching a predetermined number of the new anchors in the order of the priorities is executed.

14. The storage medium according to claim 1, characterized in that, in the processing starting part determination step, when a title of the original hypertext is matched with a predefined title condition, an anchor matched with the predefined anchor condition is set as the original anchor so as to determine the processing starting part; and, in the processing range determination step, the processing range is determined as the entire original hypertext.

15. The storage medium according to claim 14, characterized in that, in the processing starting part determination step, update information or new information is defined as the title; TOP, top page, homepage, or a synonym thereof is defined as the anchor condition; and an anchor matched with the TOP, the top page, the homepage, or the synonym thereof is set as an original anchor.

16. The storage medium according to claim 1, characterized in that the computer is a client which accesses a web page on a network so as to receive and display the original hypertext, a proxy cache server which substitutes for the process of the client, or a web server which transmits the original hypertext with respect to a browsing request from a client; and the client or the proxy cache server executes the hypertext conversion program when receiving the original hypertext, and the server executes the hypertext conversion program when transmitting the original hypertext.

17. A hypertext conversion method executed by a client which browses a web page, a proxy cache server which substitutes the process of the client, or a web server which transmits a hypertext with respect to a browsing request of the client, the hypertext conversion method characterized by including a processing starting part determination step in which a processing starting part is determined in an original hypertext serving as a processing object;

a processing range determination step in which a processing range including an original anchor in the original hypertext is determined based on the processing starting part;

a link destination hypertext acquisition step in which a link destination hypertext of the original anchor present in the processing range is acquired;

a link destination anchor information extraction step in which link destination anchor information composed of a pair of a character string and a link destination URL of a link destination anchor is extracted from the link destination hypertext;

an original anchor effective range determination step in which an original anchor effective range is determined which serves as a candidate character string range to which a new anchor is added in the original hypertext;

a character string comparison step in which a character string present in the original anchor effective range is compared with the character string present in the link destination anchor information, and in which a matched range in the original anchor effective range is determined;

a new anchor information generation step in which the link destination URL paired with the link destination character string of the link destination anchor information which is matched in the character string comparison is set as a new link destination URL, and in which new anchor information is generated composed of a pair of the matched range and the new link destination URL; and a new anchor attachment step in which a new anchor describing the new link destination URL in the new anchor information is attached to a character string of the original hypertext present in the matched range in the new anchor information, so as to convert the original hypertext to a new hypertext.

18. A hypertext conversion device which functions as a client which browses a web page, as a proxy cache server which substitutes the process of the client, or as a web server which transmits a web page with respect to a browsing request of the client, the hypertext conversion device characterized by having a processor;

a memory;

a processing starting part determination unit which determines a processing starting part in an original hypertext serving as a processing object;

a processing range determination unit which determines a processing range including an original anchor in the original hypertext based on the processing starting part;

a link destination hypertext acquisition unit which acquires a link destination hypertext of the original anchor present in the processing range;

a link destination anchor information extraction unit which extracts link destination anchor information composed of a pair of a character string and a link destination URL of a link destination anchor from the link destination hypertext;

an original anchor effective range determination unit which determines an original anchor effective range which serves as a candidate character string range to which a new anchor is added in the original hypertext;

a character string comparison unit which compares a character string present in the original anchor effective range with the character string present in the link destination anchor information and determines a matched range in the original anchor effective range;

a new anchor information generation unit which sets the link destination URL paired with the link destination character string of the link destination anchor information which is matched in the character string comparison as a new link destination URL and generates new anchor information composed of a pair of the matched range and the new link destination URL; and a new anchor attachment unit which attaches a new anchor describing the new link destination URL in the new anchor information to a character string of the original hypertext present in the matched range in the new anchor information, so as to convert the original hypertext to a new hypertext.

\* \* \* \* \*